(12) United States Patent
Song et al.

(10) Patent No.: US 10,642,385 B1
(45) Date of Patent: May 5, 2020

(54) TOUCH INPUT DEVICE AND KEYBOARD DEVICE FOR ELECTRONIC DEVICES

(71) Applicant: Apple Inc., Cupertino, CA (US)

(72) Inventors: Qiaojian Song, Singapore (SG); Alosious Pradeep Prabhakar, Singapore (SG); Shawn Pereira, Singapore (SG); Surendar Veerasamy Panneerselvam, Singapore (SG); Wee Chun Eng, Singapore (SG)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 15/706,202

(22) Filed: Sep. 15, 2017

(51) Int. Cl.
| | |
|---|---|
| *G06F 3/00* | (2006.01) |
| *G06F 3/038* | (2013.01) |
| *G06F 3/02* | (2006.01) |
| *G06F 3/0354* | (2013.01) |
| *H02J 7/02* | (2016.01) |
| *G06F 3/044* | (2006.01) |
| *G06F 3/0488* | (2013.01) |

(52) U.S. Cl.
CPC .......... *G06F 3/0383* (2013.01); *G06F 3/0202* (2013.01); *G06F 3/03547* (2013.01); *H02J 7/025* (2013.01); *G06F 3/044* (2013.01); *G06F 3/04886* (2013.01); *G06F 2203/0381* (2013.01); *G06F 2203/0384* (2013.01)

(58) Field of Classification Search
CPC .. G06F 3/0383; G06F 3/0202; G06F 3/03547; G06F 3/044; G06F 3/04886; G06F 2203/0381; G06F 2203/0384; H02J 7/025
See application file for complete search history.

(56) References Cited

U.S. PATENT DOCUMENTS

| | | | |
|---|---|---|---|
| 8,581,886 B2 | 11/2013 | Pant et al. | |
| 9,513,756 B1* | 12/2016 | Mishra | ..................... G06F 3/044 |
| 10,078,483 B2 | 9/2018 | Finnan | |
| 2011/0074344 A1* | 3/2011 | Park | ........................ H01F 38/14 |
| | | | 320/108 |
| 2011/0127953 A1* | 6/2011 | Walley | ............... G06K 7/10207 |
| | | | 320/108 |
| 2011/0241607 A1 | 10/2011 | Wiegers | |
| 2013/0026984 A1* | 1/2013 | Yamamoto | .............. H02J 50/10 |
| | | | 320/108 |

(Continued)

FOREIGN PATENT DOCUMENTS

WO 2014184610 A1 11/2014

*Primary Examiner* — Christopher E Leiby
(74) *Attorney, Agent, or Firm* — Dickinson Wright RLLP

(57) ABSTRACT

A keyboard device and a touch input device are disclosed. The keyboard device may include several keys designed to generate a command to a computing system, and the touch input device may include a touch input surface designed to generate a touch input by contact with the touch input surface. In addition to carrying several keys, the keyboard device is designed to magnetically couple to the touch input device. Further, the keyboard device may include a transmitter coil and the touch input device may include a receiver coil such that the keyboard device can transmit power to the touch input device by inductive power transmission. The inductive charging can be used to power i) the touch input device, ii) a battery of the touch input device, and/or iii) an electronic device (e.g., smartphone, wearable device, or handheld device) located on the touch input surface.

20 Claims, 15 Drawing Sheets

(56) References Cited

U.S. PATENT DOCUMENTS

| | | | |
|---|---|---|---|
| 2014/0049911 A1* | 2/2014 | Corbin | A45C 13/002 361/679.58 |
| 2014/0218302 A1* | 8/2014 | Carlson | G06F 3/041 345/168 |
| 2018/0140946 A1* | 5/2018 | Ueno | G06F 3/0488 |
| 2018/0224897 A1* | 8/2018 | Tucker | E05D 1/06 |
| 2018/0329527 A1* | 11/2018 | Park | G06F 3/046 |

* cited by examiner

TOUCH INPUT DEVICE AND KEYBOARD DEVICE FOR ELECTRONIC DEVICES

FIELD

The following description relates to peripheral input devices. In particular, the following description relates to keyboard devices and touch input devices designed to pair, both by magnetic coupling and wireless communication, with another input device or a computing system. Regarding the magnetic coupling, each of the keyboard device and the touch input device may include one or more magnets. The coupling and pairing allow for device charging and/or software updates, including firmware updates.

BACKGROUND

Touch input devices, such as keyboard devices and touchpads, are used as input mechanisms to electronic devices such as desktop computers and laptop computers. Keyboard devices include an assembly of keys, with each of the keys providing a recognized input, when depressed, to the electronic device. Touchpads include a flat surface designed to receive a touch input by contact with the flat surface using a finger of a user.

SUMMARY

In one aspect, a touch input device suitable for use with a computing system is described. The touch input device may include a housing separate from the computing system. The housing may define an internal volume. The touch input device may further include a touch sensitive layer disposed in the internal volume and covered by a touch input surface configured to receive a touch input. The touch input device may further include a processor that translates the touch input across the touch input surface. The touch input device may further include an inductive charging module disposed in the internal volume and covered by the touch input surface. The inductive charging module can be configured to inductively provide energy by inductive power transmission to an electronic device located on the touch input surface.

In another aspect, a keyboard device suitable for use with a computing system is described. The keyboard device may include a keyboard device housing that includes keys and an internal volume. The keyboard device may further include a magnet disposed in the internal volume and configured to magnetically couple to a magnet of a touch input device. The keyboard device may further include an inductive charging module that includes a transmitter coil disposed in the internal volume and configured to transmit energy by inductive power transmission to a receiver coil of the touch input device.

In another aspect, a method for charging an electronic device that includes a battery and a receiver coil is described. The method may include receiving, at a touch input device, the electronic device. The touch input device may include a touch input surface through which motion across the touch input surface is translated and provided to a computing system. The method may further include generating an alternating electromagnetic field by a transmitter coil located in an internal volume of the touch input device. The method may further include inducing current at the receiver coil when the electronic device is positioned on the touch input surface. In some instances, at least some of the induced current is stored as energy in the battery.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
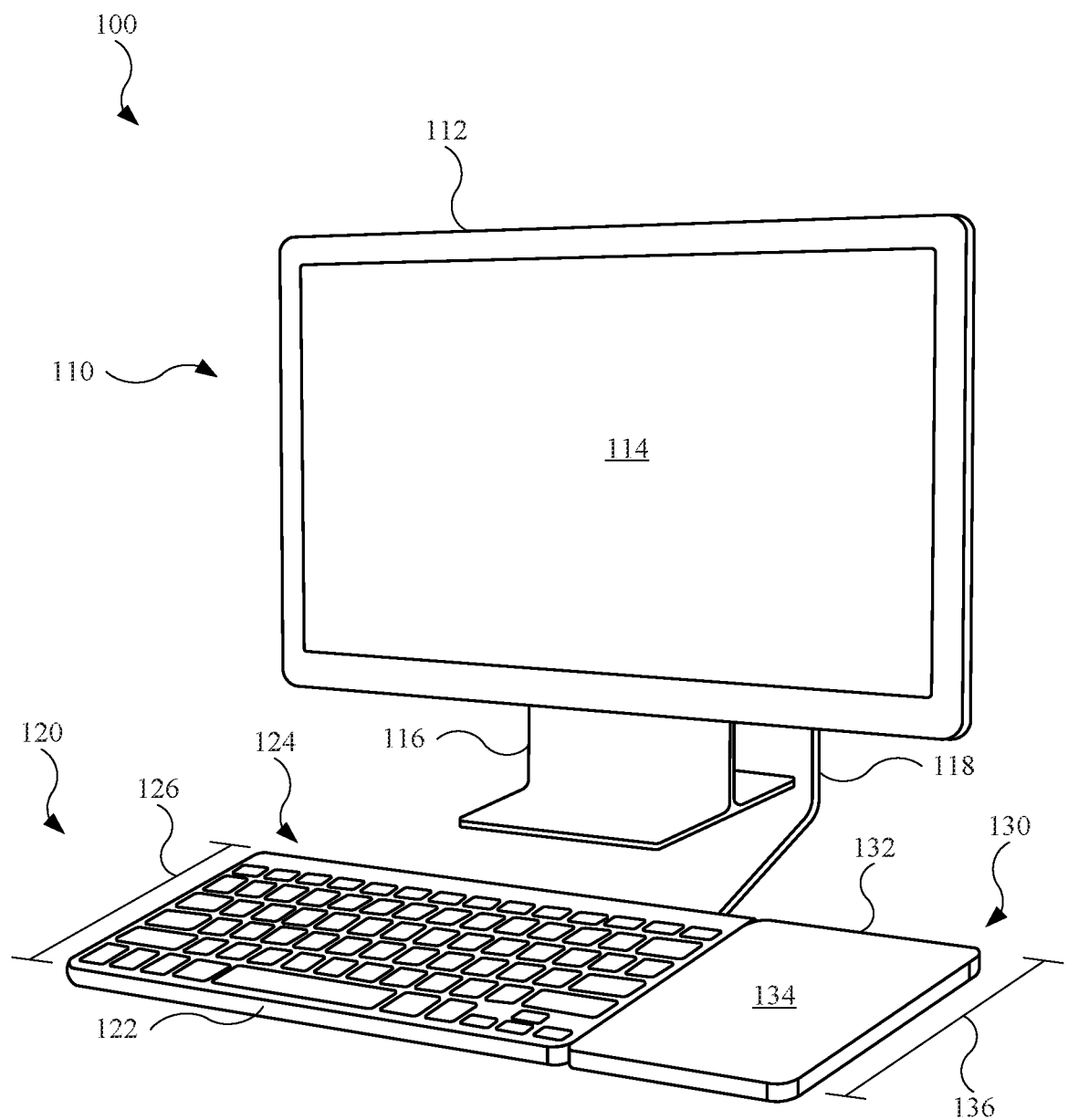
FIG. 1 illustrates an isometric view of an embodiment of a system that includes a computing system, a keyboard device, and a touch input device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to peripheral devices used in conjunction with a computing system. The computing system may include, for example, a desktop computing device or a laptop computing device. The keyboard device may include several keys, with each key (or in some cases, a combination of keys) capable of providing an input to the computing system. The touch input device is designed to translate motion of a movement of a user, or an object carried by the user, across a touch input surface (of the touch input device) with a finger of a user. This translated motion can be correlated to a command to the computing system.

In the embodiments described herein, the keyboard device and the touch input device may include separate bodies, or individual modules that can be separated. However, each of the keyboard device and the touch input device can include magnets positioned in their respective housings such that the magnets form external magnetic fields that magnetically couple together the keyboard device and the touch input device. It should be noted that the keyboard device and the touch input device can be separated by a force that overcomes a magnetic force provided by the magnetic circuit.

In addition to having multiple keys, the keyboard device may include an inductive charging module that can transmit energy (such as electrical energy). For example, the inductive charging module may include a transmitter coil. Furthermore, in addition to the touch input surface, the touch input device may include a receiver coil designed to receive the energy from the transmitter coil by way of inductive power transmission or inductive power transfer. The energy can be used to power the touch input device, or a device positioned on the touch input device. Alternatively, the energy can be stored in an internal power supply (battery) of the touch input device.

A system described herein may include a keyboard device centrally located (to a user) with respect to the computing system and the touch input device, thereby making the keyboard device the "centerpiece," or central hub, of the system. In this manner, keyboard devices described herein are designed as multi-functional devices that provide a primary input (by virtue of the keys) to the computing system, as well as a power output to the touch input device and other devices (including electronic devices and accessory devices) configured to receive energy by inductive power transmission. Further, in some instances, a keyboard device may transfer software and/or firmware updates received from the computing device to the touch input device and other devices that are in communication with the keyboard device and/or the touch input device. Also, a device (such as an electronic device or accessory device, as non-limiting examples) in communication with the keyboard device may transmit information to the keyboard device. This information can be relayed or communicated to the computing system. The computing system may transmit information (such as the software or firmware updates) to the device, via the keyboard device, based upon the information communicated by the device and relayed to the computing system.

In some instances, the touch input device also includes an inductive charging module that can use the energy received from the keyboard device and provide the energy to an electronic device. For example, the touch input device may include a transmitter coil capable of inductively charging a receiver coil in an electronic device that is positioned on the touch input surface. The electronic device may include a mobile wireless communication device (smartphone, tablet computer), a wearable electronic device (watch), or a handheld device (digital stylus) suitable for use with the touch input surface.

While some embodiments describe the keyboard devices providing inductive charging by receiving energy from a computing system, some keyboard devices may act as a "standalone" device designed to receive energy independently from the computing system. These keyboard devices may include a port that receives energy from an external power source, such as a wall outlet. Further, in some instances, the energy can be stored in a power supply within the keyboard device. Similarly, some touch input devices may act as a "standalone" device designed to receive energy independently from the keyboard device. These touch input devices may include a port that receives energy from an external power source, such as a wall outlet, and in some instances, the energy can be stored in a power supply within the touch input device.

These and other embodiments are discussed below with reference to FIGS. 1-18. However, those skilled in the art will readily appreciate that the detailed description given herein with respect to these Figures is for explanatory purposes only and should not be construed as limiting.

FIG. 1 illustrates an isometric view of an embodiment of a system 100 that includes a computing system 110, a keyboard device 120, and a touch input device 130, in accordance with some described embodiments. The computing system 110 may include a housing 112 and a display assembly 114 supported and carried by the housing 112. The housing 112 may include metal (such as aluminum or an alloy that include aluminum), a rigid plastic, rubber, silicone, or a combination thereof. The display assembly 114 may include a display layer that includes a liquid crystal display, a light-emitting diode display, an organic light-emitting diode display, or an active-matrix organic light-emitting diode display, as non-limiting examples.

In addition to the housing 112 and the display assembly 114, the computing system 110 may further include several operational components, such as circuit boards having processor circuits and storage (memory) circuits, audio modules, flexible circuits, and microphones, as non-limiting examples. The operational components may be positioned in the housing 112, and may be used in conjunction with the display assembly 114, the keyboard device 120, and/or the touch input device 130. Also, the computing system 110 may include a stand 116 rotationally connected to the housing 112. The stand 116 is designed to support the housing 112, the display assembly 114, and the aforementioned operational components.

The keyboard device 120, also referred to as a peripheral device (to the computing system 110), may include a housing 122, or keyboard device housing, that carries keys 124, with each key of the keys 124 being designed to provide an input or command to the computing system 110 that can be recognized and processed by the computing system 110. The keys 124 may be distributed in accordance with a QWERTY configuration, commonly known in the art for keyboards, and may include a row for numbers and row for various function keys. As shown, the computing system 110 is in communication with the keyboard device 120 by a cable 118 electrically coupled to both the computing system 110 and the keyboard device 120. In this regard, the computing system 110 may receive energy (electrical energy) from an external source (not shown), such as a wall outlet, and transfer at least some of the energy to the keyboard device 120.

The touch input device 130, also referred to as a peripheral device (to the computing system 110), may include a housing 132, or touch input device housing, that defines a touch input surface 134 designed to receive touch input in the form of a gesture or swipe, as non-limiting examples, by a user. The gesture or swipe can correlate to a command to the computing system 110. In this regard, the touch input device 130 may be in communication with the computing system 110 by way of the keyboard device 120. The communication between the touch input device 130 and the keyboard device 120 may include wireless communication using Bluetooth® protocol, as an example. Further, when the touch input device 130 is in communication, or paired, with the keyboard device 120, the touch input device 130 can also be paired with the computing system 110. In this regard, an additional user-initiated pairing between the touch input device 130 and the computing system 110 is not required, and the system 100 is simplified. The touch input device 130 may include a conductive sensing touch input device that includes a grid of wires designed to detect where the touch input(s) occur. Alternatively, the touch input device 130 may include a capacitive sensing touch input device that includes multiple capacitors that change their stored charge in a location corresponding to the touch input(s).

Also, the touch input device 130 may receive at least some of the energy provided by the computing system 110 to the keyboard device 120. This will be further discussed below. The touch input surface 134 may define a receiving surface for an electronic device (not shown). Further, some electronic devices, when placed on touch input surface 134, may receive at least some of the energy transferred to the touch input device 130 in order to charge a battery of the electronic device. This will also be further discussed below. Also, in order to enhance the overall appearance of the system 100, the keyboard device 120 may include a dimension 126 that is equal in length, or at least substantially similar in length, as a dimension 136 of the touch input device 130.

Figure 2:
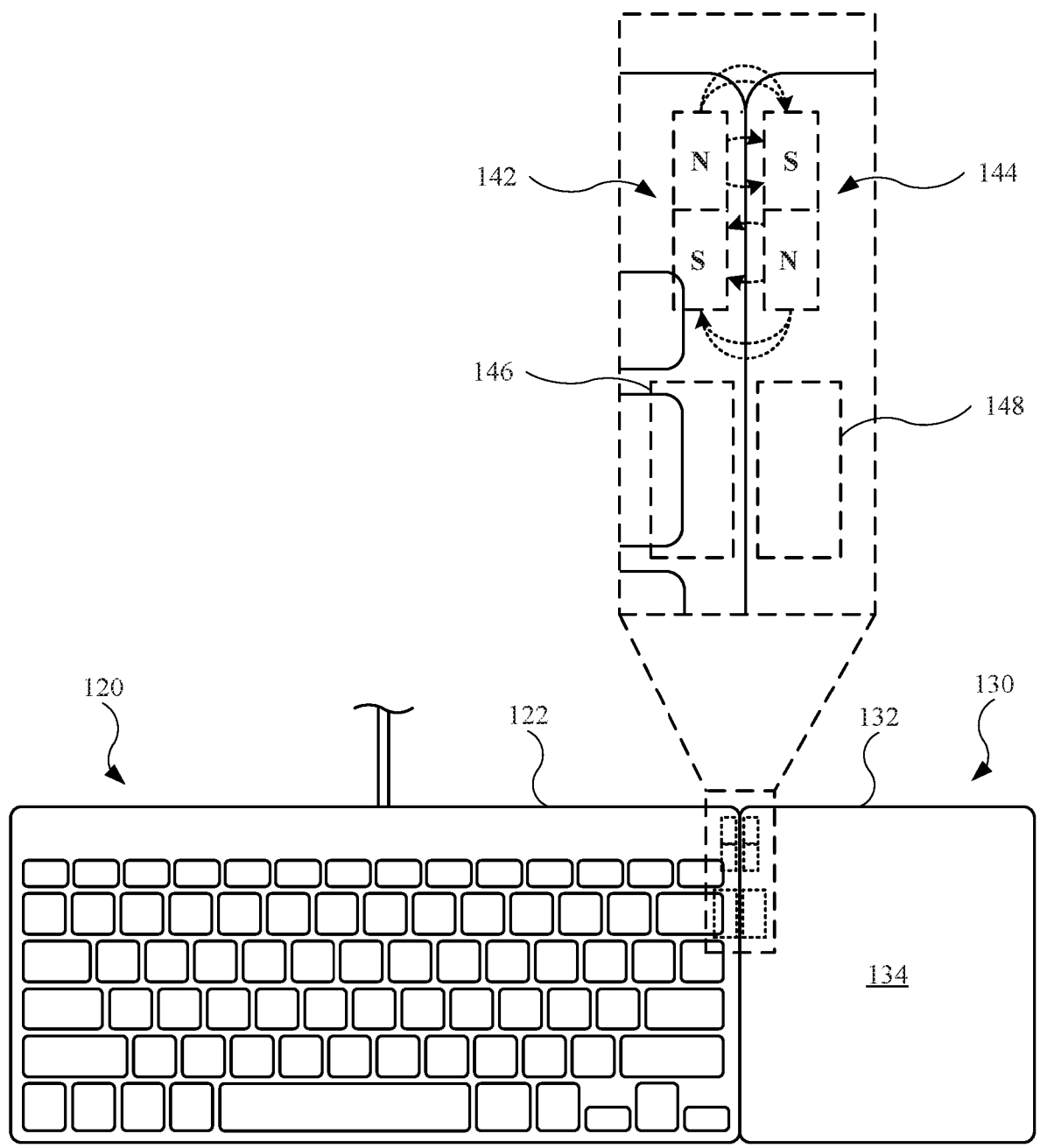
FIG. 2 illustrates a plan view of the keyboard device and the touch input device shown in FIG. 1.

FIG. 2 illustrates a plan view of the keyboard device 120 and the touch input device 130 shown in FIG. 1. As shown, the keyboard device 120 may magnetically couple to the touch input device 130 by magnets in the respective housings of the keyboard device 120 and the touch input device 130. For example, as shown in the enlarged view, the keyboard device 120 may include magnets 142 disposed in an internal volume defined by the housing 122 of the keyboard device 120. Also, the touch input device 130 may include magnets 144 disposed in an internal volume defined by the housing 132 of the touch input device 130. The magnets 142 in the keyboard device 120 are aligned proximate to a sidewall component of the housing 122 of the keyboard device 120, and the magnets 144 in the touch input device 130 are aligned proximate to a sidewall component of the housing 132 of the touch input device 130. Further, the magnetic polarity of the magnets 142 are aligned such that they can readily form a magnetic circuit with the magnets 144 of the touch input device 130. Although a discrete number of magnets are shown, the number of magnets in each device may vary. However, for the purposes of magnetically coupling the keyboard device 120 with the touch input device 130, the number of magnets 142 in the keyboard device 120 may equal the number of magnets 144 in the touch input device 130.

Also, the keyboard device 120 may further include a transmitter coil 146, or primary coil, disposed in the keyboard device 120, and the touch input device 130 may further include a receiver coil 148, or secondary coil, disposed in the touch input device 130. In this regard, the keyboard device 120 is designed to transfer energy (including electrical energy) to the touch input device 130 through inductive charging, or wireless charging. The energy received by the touch input device 130 can be i) used to power operational components of the touch input device 130, ii) stored in an internal power supply of the touch input device 130, and/or iii) used to charge/recharge an electronic device positioned on the touch input surface 134. These features will be shown and discussed further below.

Figure 3:
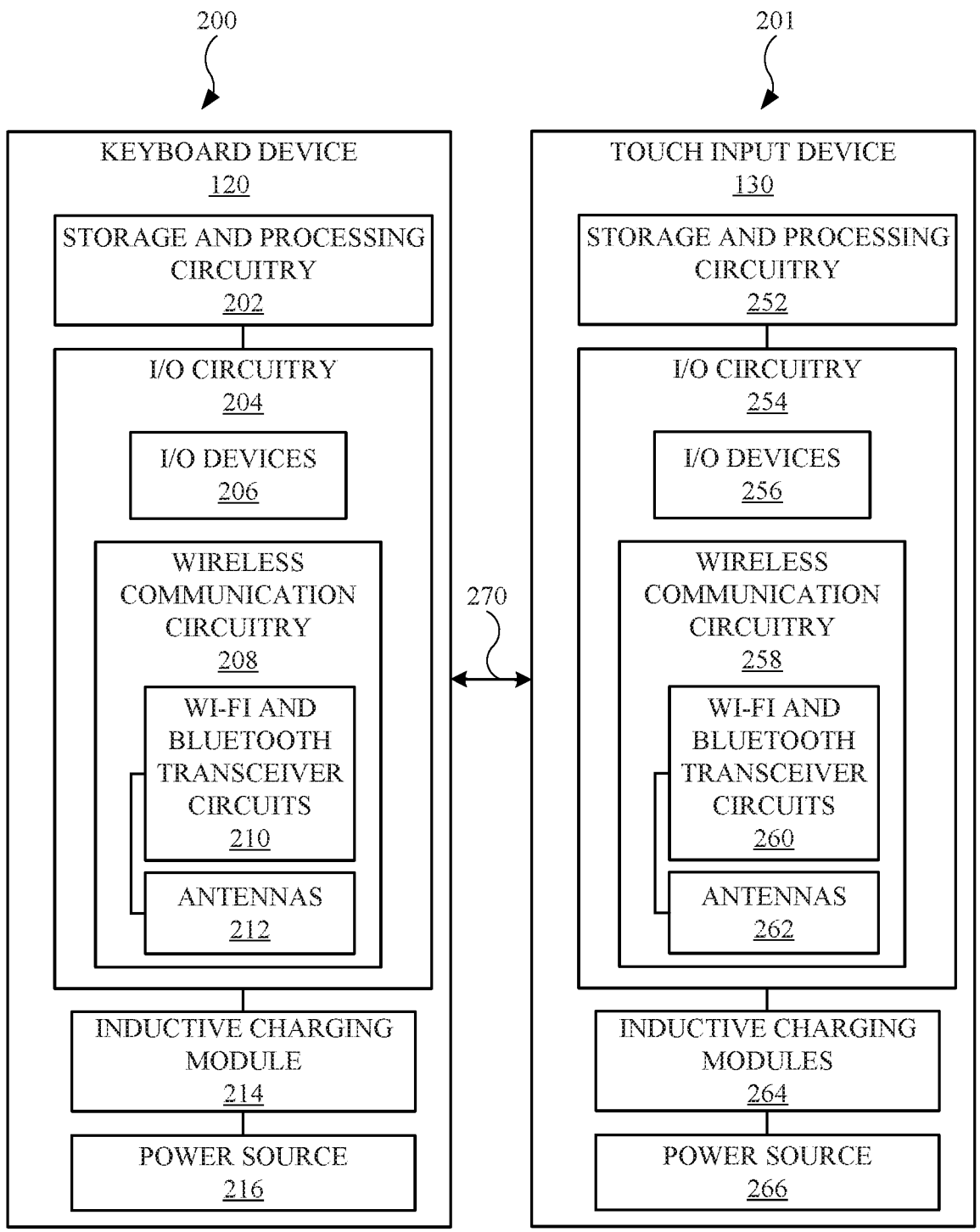
FIG. 3 illustrates a schematic diagram of the keyboard device and the touch input device shown in FIG. 2, in accordance with some described embodiments.

FIG. 3 illustrates a schematic diagram 200 of the keyboard device 120 and a schematic diagram 201 of the touch input device 130 shown in FIG. 2, in accordance with some described embodiments. The keyboard device 120 may include storage and processing circuitry 202 that includes hard disk storage, nonvolatile memory (such as flash memory or another electrically programmable read-only memory) or volatile memory. The storage and processing circuitry 202 may further include a processor, such as a microprocessor or other integrated circuit, used to process a program(s) or algorithm(s) stored on the storage circuitry.

Some programs may include instructions for handling a request from the touch input device 130 to provide electrical energy, as well as sending (and monitoring) the electrical energy to the touch input device 130. The storage and processing circuitry 202 may be used to carry communication protocols for wireless communication with the computing system 110 (shown in FIG. 1) or the touch input device 130, which may include IEEE 802.11 protocols (Wi-Fi) or Bluetooth® protocol, as examples.

The keyboard device 120 may further include I/O circuitry 204, or input-output circuitry, that allows receipt of data from the computing system 110 (shown in FIG. 1) and/or the touch input device 130. The I/O circuitry 204 may include a circuit board electrically coupled to the keys. The I/O devices 206 may include inputs such as the keys, data and power ports, light-emitting diodes ("LEDs"), and in some instances, a display that provides a dynamic function row of virtual keys.

The keyboard device 120 may further include wireless communication circuitry 208 that facilities a pairing 270, or wireless authentication and communication between the computing system 110 (shown in FIG. 1) and/or the touch input device 130. The wireless communication circuitry 208 can include Wi-Fi and Bluetooth® circuits 210 and related radio frequency (RF) components for handling RF wireless signals. The wireless communication circuitry 208 may further include antennas 212, which may include a single band, or alternatively a dual-band antenna, that can cover Wi-Fi bands, such as 2.4 Gigahertz ("GHz") and 5 GHz, and Bluetooth® bands (2.4 GHz).

The keyboard device 120 may further include an inductive charging module 214. The inductive charging module 214 may include a transmitter coil 146 (shown in FIG. 2) that includes a wire that can be at least partially wrapped around an iron core. At least one of the I/O devices 206 may be used to receive an alternating current to the inductive charging module 214 that causes the inductive charging module 214 (that is, the transmitter coil 146) to form an alternating electromagnetic field that induces an alternating electrical current to one of the inductive charging modules 264 of the touch input device 130. Alternatively, the keyboard device 120 may include a power source 216 that stores energy that can be converted to electrical energy to supply current to the inductive charging module 214. In this manner, the I/O circuitry 204 may include a power inverter that converts direct current ("DC") to an alternating current ("AC") that is then provided to the transmitter coil 146 such that the transmitter coil 146 generates the alternating electromagnetic field.

The touch input device 130 may include storage and processing circuitry 252 that includes hard disk storage, nonvolatile memory (such as flash memory or another electrically programmable read-only memory) or volatile memory. The storage and processing circuitry 252 may further include a processor, such as a microprocessor or other integrated circuit, used to process a program(s) or algorithm(s) stored on the storage circuitry. In this regard, the storage and processing circuitry 252 may include circuitry for translating motion (or a touch input) applied to a touch input surface of the touch input device 130. The resulting translation of the motion (or the touch input) may be communicated to the storage and processing circuitry 252 of the keyboard device 120 by a signal (or signals), which can include RF signals. Some programs may include instructions for requesting electrical energy from the keyboard device 120, as well as monitoring the received electrical energy. Also, the storage and processing circuitry 252 may include a program for initiating communication with the keyboard device 120 based upon a magnetic coupling between the magnets 142 (shown in FIG. 2) and the magnets 144 (shown in FIG. 2). However, a sufficient proximity between the respective wireless communication circuitry of the keyboard device 120 and the touch input device 130 may suffice (for purposes of establishing communication). The storage and processing circuitry 252 may be used to carry communication protocols for wireless communication with the computing system 110 (shown in FIG. 1) or the keyboard device 120, which may include IEEE 802.11 protocols (Wi-Fi) or Bluetooth® protocol, as examples. Further, when the touch input device 130 is in wireless communication with the keyboard device 120 by, for example, Bluetooth® protocol, the touch input device 130 may be in communication with the computing system 110 via the keyboard device 120 (assuming the keyboard device 120 is in communication with the computing system 110). In this regard, an additional communication, such as an additional Bluetooth® pairing is not required between the touch input device 130 and the computing system 110.

The touch input device 130 may further include I/O circuitry 254, or input-output circuitry, that allows receipt of data from the computing system 110 (shown in FIG. 1) and/or the keyboard device 120. The I/O devices 256 may include inputs such as the touch input surface 134, data and power ports, light-emitting diodes ("LEDs"), and in some instances, a display that provides a dynamic function row of virtual keys.

The touch input device 130 may further include wireless communication circuitry 258 that facilities a pairing 270, or wireless communication between the computing system 110 (shown in FIG. 1) and/or the keyboard device 120. The wireless communication circuitry 258 can include Wi-Fi and Bluetooth® circuits 260 and related RF components for handling RF wireless signals. The wireless communication circuitry 258 may further include antennas 262, which may include a single band, or alternatively a dual-band antenna, that can cover Wi-Fi bands, such as 2.4 GHz and 5 GHz, and Bluetooth® bands (2.4 GHz).

Also, when the touch input device 130 is paired with the keyboard device 120, the wireless communication circuitry 208 of the keyboard device 120 may transmit information to the wireless communication circuitry 258 of the touch input device 130. For example, the keyboard device 120 may receive software and/or firmware updates from a computing system (such as the computing system 110 shown in FIG. 1) downloaded from a network server when the computing system determines a software and/or firmware update is available, and provide the software and/or firmware updates to the touch input device 130. Further, when an electronic device (shown below) is positioned on a touch input surface of the touch input device 130, the electronic device may include wireless communication circuitry used to send a request to the touch input device 130 to determine whether a software and/or firmware update is available. The touch input device 130 can communicate this request to a computing system (such as the computing system 110 shown in FIG. 1) via the keyboard device 120. If a software and/or firmware update is available, the computing system 110 can download the software and/or firmware update from a network server, and send the update to the touch input device 130 via the keyboard device 120. The touch input device 130 can then communicate and upload the software and/or firmware update to the electronic device. Alternatively, during instances when the touch input device 130 is in direct communication with the computing system 110, the software and/or firmware can be downloaded directly to the touch input device 130 (without first being transmitted to the keyboard device 120).

The touch input device 130 may further include inductive charging modules 264. The inductive charging modules 264 may include a receiver coil 148 (shown in FIG. 2), or secondary coil, that includes a wire that may at least partially wrap around an iron core. In this manner, when the transmitter coil 146 of the inductive charging module 214 in the keyboard device 120 generates an alternate electromagnetic field (based on the alternating current), an induced current can be provided to the receiver coil 148 of the inductive charging modules 264 in the touch input device 130. The I/O circuitry 254 may include a rectifier that converts the induced AC to DC that can be stored in a power source 266 of the touch input device 130. Also, the I/O circuitry 204 of the keyboard device 120 and the I/O circuitry 254 of the touch input device 130, in combination with the storage and processing circuitry 202 of the keyboard device 120 and the storage and processing circuitry 252 of the touch input device 130, may initiate an inductive charging process subsequent to a magnetic coupling between the magnets 142 (shown in FIG. 2) and the magnets 144 (shown in FIG. 2). In this regard, the magnets 142 (shown in FIG. 2) and the magnets 144 (shown in FIG. 2) may include electromagnets that are monitored for changes in external magnetic fields produced by the aforementioned magnets in order to determine whether the magnetic coupling is established. This may also provide a foundation for an authentication of the touch input device 130 by the keyboard device 120. Accordingly, at least the storage and processing circuitry 202 may include stored programs for initiating inductive charging and for authentication.

The inductive charging modules 264 may further include a transmitter coil designed to receive an alternating electrical current that causes the transmitter coil to generate an alternating electromagnetic field that induces an alternating electrical current to a receiver coil in an electronic device that is positioned on the touch input surface 134 (shown in FIGS. 1 and 2). Alternatively, the touch input device 130 may include a power source 266 that stores energy that can be converted to electrical energy to supply current to the transmitter coil. In this manner, the I/O circuitry 254 may include a power inverter that converts DC to AC that is then provided to the transmitter coil such that the transmitter coil generates the alternating electromagnetic field. The various features shown and/or described in the schematic diagram 200 of the keyboard device 120 and the schematic diagram 201 of the touch input device 130 may be included in any keyboard device and touch input device, respectively, shown and described herein.

Figure 4:
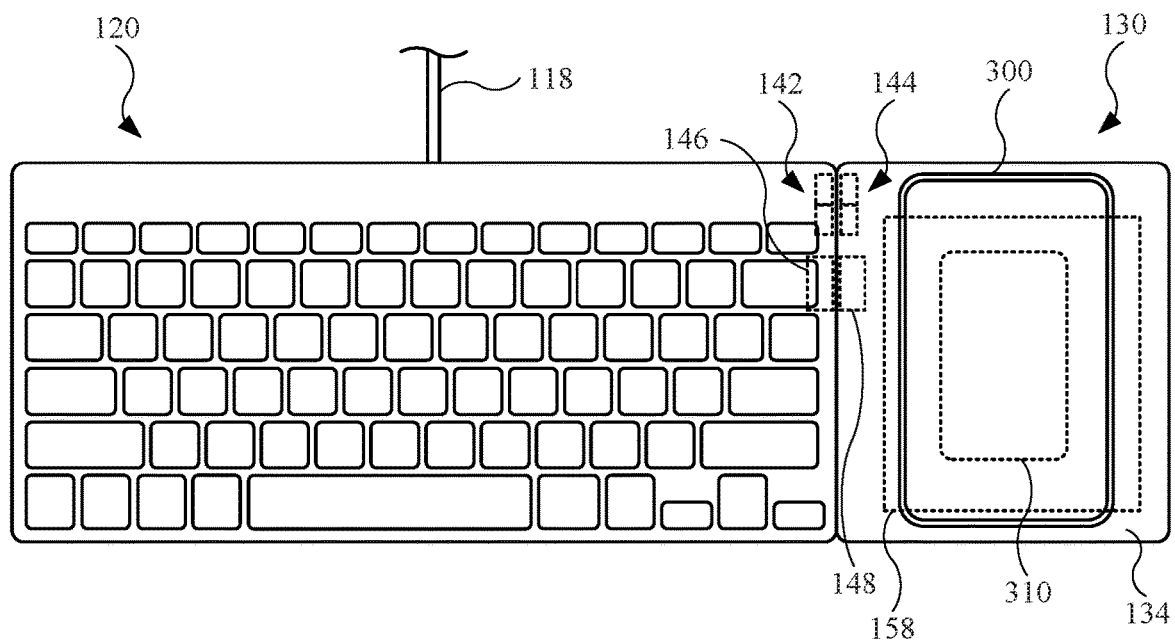
FIG. 4 illustrates a plan view of the keyboard device and the touch input device shown in FIG. 3, further showing a portable electronic device positioned on the touch input surface.

FIG. 4 illustrates a plan view of the keyboard device 120 and the touch input device 130 shown in FIG. 3, further showing a portable electronic device 300 positioned on the touch input surface 134. The portable electronic device 300 may include a mobile wireless communication device (smartphone) or a tablet computer device. As shown, the keyboard device 120 is magnetically coupled to the touch input device 130 by way of the magnets 142 in the keyboard device 120 and the magnets 144 in the touch input device 130. Also, the magnetic coupling between the magnets 142 in the keyboard device 120 and the magnets 144 of the touch input device 130 provide sufficient proximity between the transmitter coil 146 and the receiver coil 148 such that transmitter coil 146 can induce current (by a generated alternating external magnetic field) to the receiver coil 148. The computing system 110 (shown in FIG. 1) may provide the energy via the cable 118.

FIG. 4 further shows the touch input device 130 including a transmitter coil 158 capable of receiving energy, by way of the induced current to the receiver coil 148. Also, the portable electronic device 300 may include a receiver coil 310. Using at least some of the energy received by the receiver coil 148, the transmitter coil 158 can generate an alternating electromagnetic field that induces electrical current (AC) to the receiver coil 310 of the portable electronic device 300. The electrical current received by the receiver coil 310 can be stored as electrical energy in a battery (not shown) in the portable electronic device 300 subsequent to a rectifier (not shown) converting the induced AC to DC. As a result, the touch input device 130 can serve as an input device that receives a touch input as well as an inductive charging, or wireless charging, station for the portable electronic device 300.

In addition to receiving energy to charge a battery in the portable electronic device 300, the portable electronic device 300 may receive software updates as well as firmware updates through the touch input device 130. As described above, a computing system (not shown) can download the software and/or firmware update, and send the update to the portable electronic device 300 via the keyboard device 120 and the touch input device 130. Alternatively, during instances when the touch input device 130 is in direct communication with the computing system 110 (shown in FIG. 1), the software and/or firmware can be downloaded directly to the touch input device 130 (without first being transmitted to the keyboard device 120).

Figure 5:
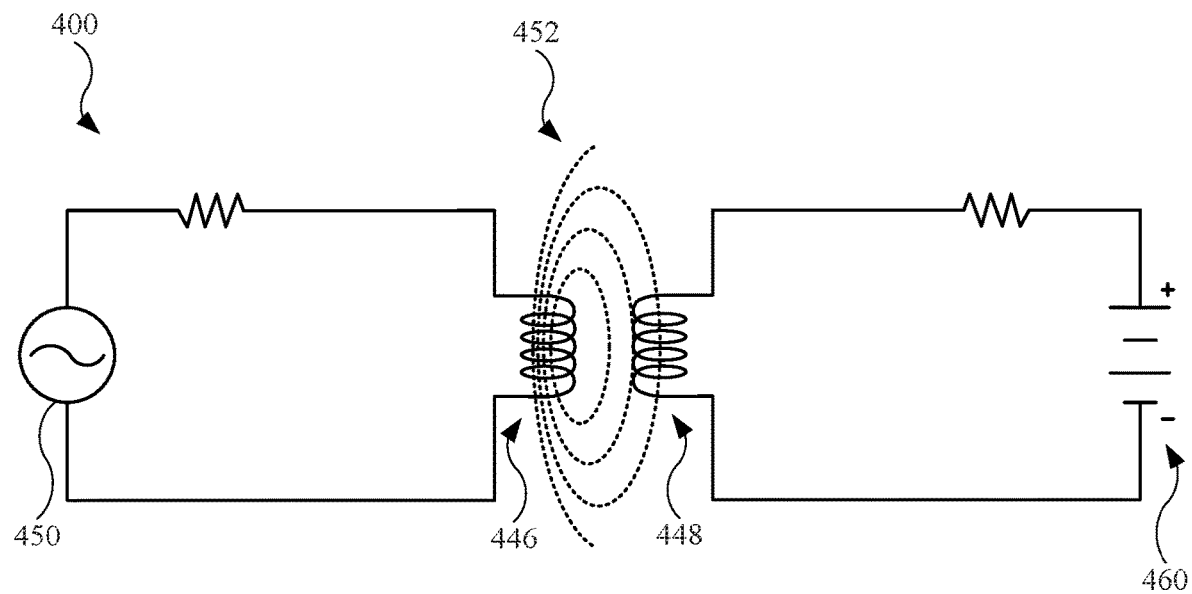
FIG. 5 illustrates a circuit diagram of showing a transmitter coil transferring power to a receiver coil through an inductive, or wireless, method, in accordance with some described embodiments.

FIG. 5 illustrates a circuit diagram 400 of showing a transmitter coil 446 transferring power to a receiver coil 448 through an inductive, or wireless, method, in accordance with some described embodiments. The exemplary illustration in FIG. 5 may also be referred to as an inductive power transfer. As shown, the transmitter coil 446 is connected to an AC power source 450. In some embodiments (not shown), the AC power source 450 is replaced by a DC power source connected to an oscillator circuit in order to produce an oscillating electrical current. The receiver coil 448 is connected to a DC power source 460 that can include a rechargeable battery, as a non-limiting example.

While receiving AC from the AC power source 450, the transmitter coil 446 generates an external magnetic field 452 having an alternating magnetic polarity. When the receiver coil 448 is within range of the transmitter coil 446, the external magnetic field 452 passes through the receiver coil 448. The alternating magnetic polarity induces an electromotive force at the receiver coil 448. The induced electromotive force corresponds to an induced alternating current to the receiver coil 448, which passes through components, such as rectifiers and filters, to produce a DC current used to power (charge/recharge) the DC power source 460. The transmitter coil 446 may be present in a keyboard device described herein, and the receiver coil may be present in a touch input device described herein. Furthermore, the transmitter coil 446 may be present in a touch input device described herein, and the receiver coil may be present in an electronic device described herein that includes a rechargeable battery.

Figure 6:
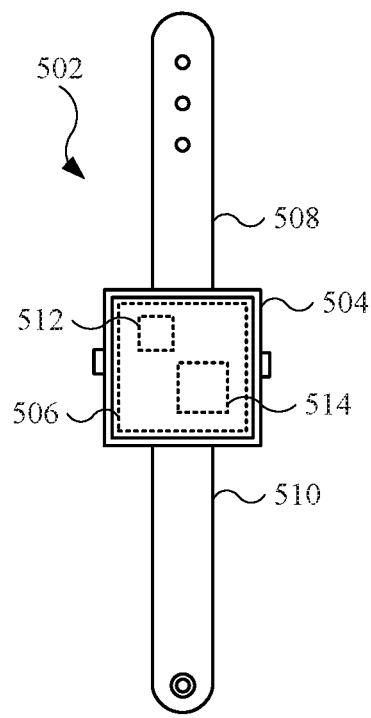
FIG. 6 illustrates a plan view of an embodiment of a wearable electronic device that can be charged by a touch input device described herein.
Figure 7:
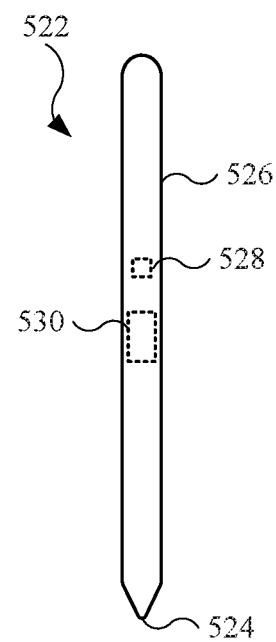
FIG. 7 illustrates a plan view of an embodiment of a handheld device that can be charged by a touch input device described herein.
Figure 8:
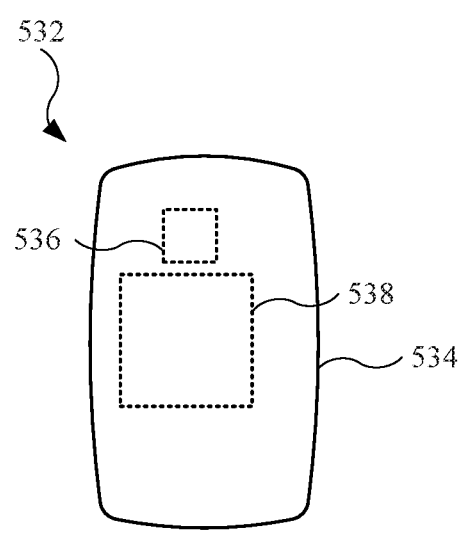
FIG. 8 illustrates a plan view of an embodiment of a pointing device that can be charged by a touch input device described herein.

FIGS. 6-8 show various types of electronic devices that can include a rechargeable battery and a receiver coil, and as a result, can be charged/recharged by a touch input device described herein. In some cases, the various types of electronic devices, including portable electronic devices, may be charged/recharged by a transmitter coil located in a keyboard device. The electronic devices shown in FIGS. 6-8 represent consumer electronic devices and accessory devices suitable for use with a computing system described herein. It should be noted that the electronic devices shown in FIGS. 6-8 is not an exhaustive list, and other types of electronic devices are possible. Also, at least some electronic device shown in FIGS. 6-8 may include a metal housing that can otherwise interfere with induced power transmission. However, at least some portion of a housing described for the electronic devices includes a non-metal portion, or a substantially reduced metal portion, to prevent the blocking of the induced power transmission.

FIG. 6 illustrates a plan view of an embodiment of a wearable electronic device 502 that can be charged by a touch input device described herein. As shown, the wearable electronic device 502 may include a housing 504 and a display assembly 506 carried by the housing 504. The wearable electronic device 502 may further include a band 508 designed to couple with a band 510 to secure the housing 504 (and any components carried by the housing 504) to an appendage of a user. The wearable electronic device 502 may further include a receiver coil 512 that can receive an induced current used to charge a battery 514, with the receiver coil 512 and the battery 514 both located in the housing 504. Other components—processor circuits, wireless circuits, audio modules, microphones, buttons, switches, etc.—may be present in the wearable electronic device 502 and may receive power from the battery 514.

FIG. 7 illustrates a plan view of an embodiment of a handheld device 522 that can be charged by a touch input device described herein. The handheld device 522 may include a digital stylus designed to interact with a display assembly. Further, the handheld device 522 may be used to provide an input to a touch input surface 134 of the touch input device 130 (shown in FIG. 1). In this regard, the handheld device 522 may include a tip region 524 designed to interact with a display assembly or a touch input surface. The handheld device 522 may further include a housing 526. Within the housing 526, the handheld device 522 may further include a receiver coil 528 that can receive an induced current used to charge a battery 530, with the receiver coil 528 and the battery 530 both located in the housing 526. Other components—processor circuits, wireless circuits, audio modules, microphones, buttons, switches, etc.—may be present in the handheld device 522 and may receive power from the battery 530.

FIG. 8 illustrates a plan view of an embodiment of a pointing device 532 that can be charged by a touch input device described herein. The pointing device 532 may be referred to as a "mouse" that is suitable for use with a computing system described herein. The pointing device 532 may include a housing 534. Within the housing 534, the pointing device 532 may further include a receiver coil 536 that can receive an induced current used to charge a battery 538, with the receiver coil 536 and the battery 538 both located in the housing 526. Other components—processor circuits, wireless circuits, audio modules, microphones, buttons, switches, etc.—may be present in the pointing device 532 and may receive power from the battery 538.

The keyboard device 120 (shown in FIG. 1) can be referred to as a wired keyboard device as the keyboard device 120 is electrically coupled to a computing system 110 (shown in FIG. 1). However, in some instances, a keyboard device described herein does not require a wired connection and may communicate with a computing system described herein by wireless communication.

Figure 9:
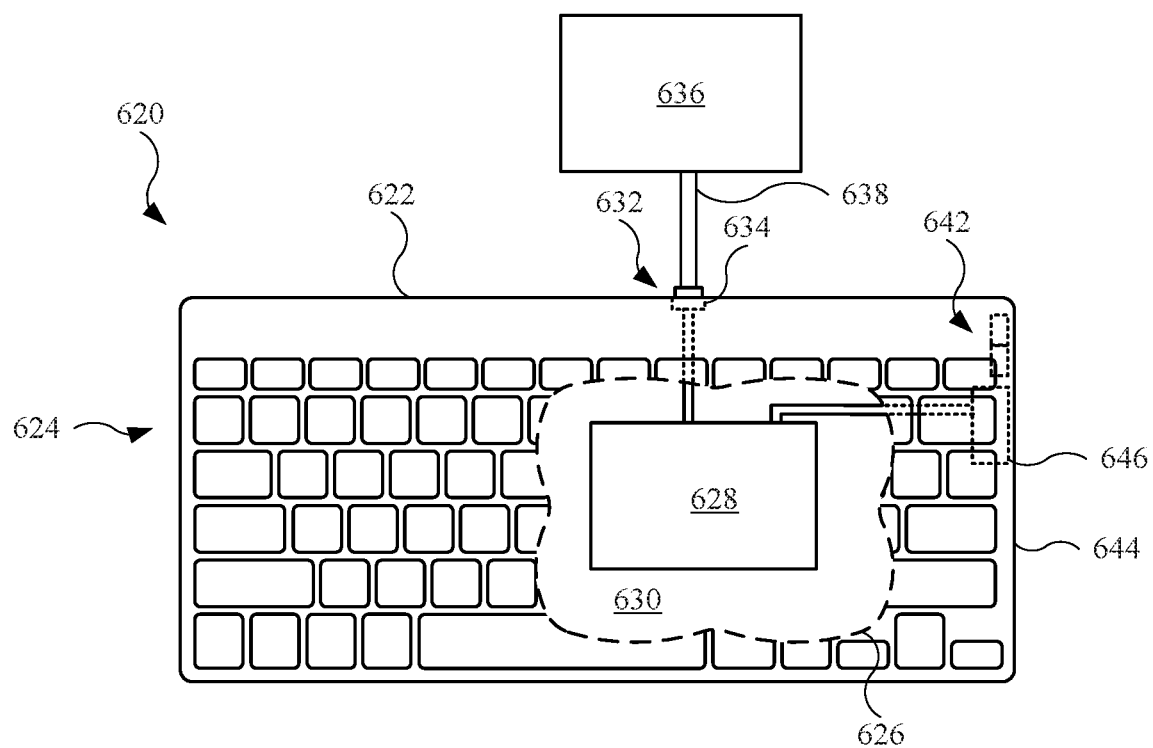
FIG. 9 illustrates a plan view of an alternate embodiment of a keyboard device that includes an internal power supply designed to store energy usable by the keyboard device and/or to charge another device, in accordance with some described embodiments.

For example, FIG. 9 illustrates a plan view of an alternate embodiment of a keyboard device 620 that includes an internal power supply 628 designed to store energy usable by the keyboard device 620 and/or to charge another device, in accordance with some described embodiments. The keyboard device 620 may include any feature(s) described herein for a keyboard device. As shown, the keyboard device 620 may include a housing 622 and keys 624 that are carried by the housing 622. Also, the keyboard device 620 may include magnets 642 arranged along a sidewall 644 of the housing 622 in a manner similar to a manner previously described for magnets in a keyboard device. Accordingly, a device, such as a touch input device described herein, can magnetically couple to the keyboard device 620 along the sidewall 644.

A partial internal view 626 of the keyboard device 620 shows the internal power supply 628 within an internal volume 630 (defined by the housing 622) that provides a space for components (circuit boards, processor circuits, wireless circuits, light elements, etc.). The internal power supply 628 may include a rechargeable DC battery. The keyboard device 620 may include a port 632 that includes a connector 634 designed to electrically couple with an external power supply 636 by a cable 638. The external power supply 636 may receive AC from a wall outlet and then convert AC to DC. The cable 638 may also include circuitry (not shown) designed to convert AC to DC. The external power supply 636 may also store energy, similar to a battery or battery pack. The external power supply 636, when electrically coupled to the connector 634, can provide energy to the internal power supply 628, which can be stored in the internal power supply 628 for later use. In this regard, the internal power supply 628 may supply energy to a transmitter coil 646 positioned in the internal volume 630. The energy provided by the internal power supply 628 may pass through a power inverter (not shown) in order to switch from DC to AC, thereby allowing a touch input device (such as the touch input device 130, shown in FIG. 1) or an electronic device (such as those shown in FIGS. 6-8) to receive energy through inductive power transfer.

In order to communicate with a computing system, touch input device, or electronic device described herein, the keyboard device 620 may include wireless communication circuitry, such as the wireless communication circuitry 208 (shown in FIG. 3). As a result, the keyboard device 620 may be referred to as a wireless keyboard device that does not require cables to connect to a computing system. In other words, the wireless keyboard device and its components lacks an electrically coupling to cables that are coupled to a computing system described herein. Also, any electronic device shown in FIGS. 6-8 may include wireless communication circuitry used to establish communication with the keyboard device 620.

Figure 10:
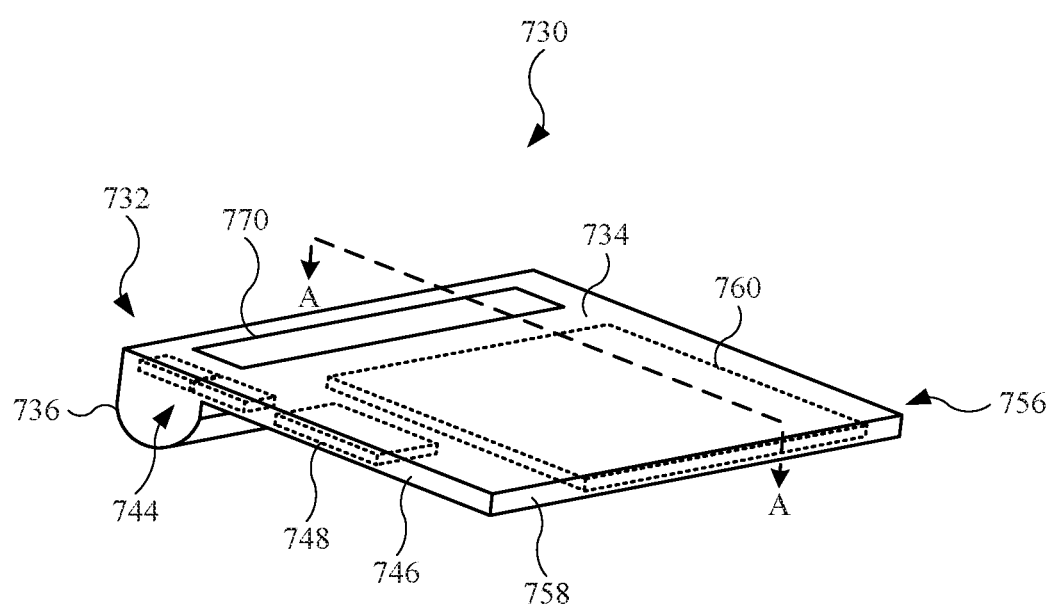
FIG. 10 illustrates an isometric view of an alternate embodiment of a touch input device, in accordance with some described embodiments.

FIG. 10 illustrates an isometric view of an alternate embodiment of a touch input device 730, in accordance with some described embodiments. The touch input device 730 may include any feature(s) described herein for a touch input device. As shown, the touch input device 730 may include a housing 732 that defines an internal volume to carry several components, such as storage and processor circuits, wireless circuits, battery, and a touch input layer for a touch input surface 734 (defined in part by the housing 732). The touch input device 730 is designed to translate motion of a movement of a user, or an object carried by the user, across the touch input surface 734. The translated motion can correspond to motion of a cursor (not shown) presented on a display of a computing system described herein, or can correspond to an object (or objects) drawn in a software application (shown below).

The touch input device 730 may further include a support 736 places the touch input surface 734 at a non-zero angle with respect to a horizontal plane (not shown). The support 736 may also at least partially define the internal volume, and as a result, may also carry components. Also, the touch input device 730 may further include magnets 744 positioned in the internal volume proximate to a sidewall 746 (of the housing 732). The magnets 744 are designed to magnetically couple with a device, such as a keyboard device shown and described herein. Also, the touch input device 730 may further include a receiver coil 748 positioned in the internal volume proximate to the sidewall 746. Using the receiver coil 748, the touch input device 730 can receive energy by inductive power transmission by a transmitter coil in a keyboard device shown and described herein. The touch input device 730 may further include a transmitter coil 760 designed to transfer energy, received by the receiver coil 748, to an electronic device (not shown) that is capable of receiving energy by inductive power transmission. It should be noted that the material(s) of the housing 732 in a location corresponding to the touch input surface 734 may include a non-metal material, or a substantially reduced amount of metal.

Also, in some embodiments, the touch input device 730 may include one or more transmitter coils, with at least one of the transmitter coils positioned along a sidewall of the touch input device 730. For example, the touch input device 730 may include a sidewall 756 that is parallel, or at least approximately parallel, with respect to the sidewall 746, and perpendicular, or at least approximately perpendicular, with respect to the touch input surface 734. The touch input device 730 may include a transmitter coil (not shown) positioned internally in the touch input device 730 and along the sidewall 756, allowing a device (not shown) to be inductively charged by the transmitter coil when the device includes a receiver coil within sufficient proximity to the sidewall 756 to induce current in the receiver coil. The touch input device 730 may further include an additional transmitter coil (not shown) positioned internally in the touch input device 730 and along a sidewall 758 that is perpendicular, or at least approximately perpendicular, with respect to the sidewall 746 and the touch input surface 734. The additional transmitter coil may also be configured to inductively charge a device within sufficient proximity to the sidewall 758.

Also, in some instances, the touch input device 730 may include a display assembly 770 designed to illuminate and present visual information in the form of textual information, an application toolbar, and/or icons representing a particular command associated with a software program. When the touch input device 730 is in communication with a computing system described herein, either through a direct wireless communication with the computing system or an indirect wireless communication via a keyboard device described herein, the display assembly 770 may also be in communication with the computing system. In this regard, the display assembly 770 may present visual information in accordance with, or specific to, a software application(s) running on the computing system. This will be further shown below.

Figure 11:
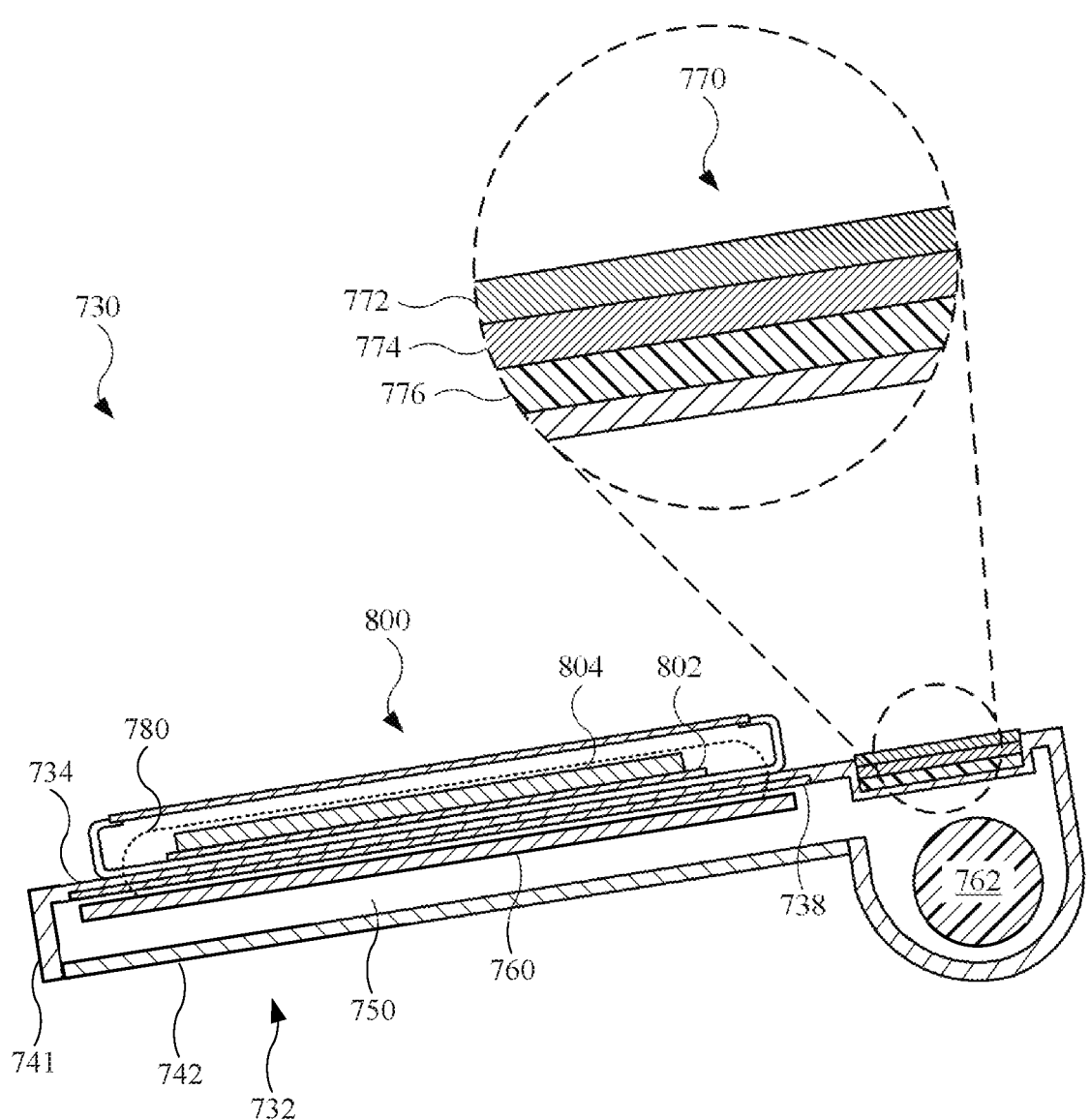
FIG. 11 illustrates a cross sectional view of the touch input device shown in FIG. 10, further showing a portable electronic device positioned on the touch input surface.

FIG. 11 illustrates a cross sectional view of the touch input device 730 shown in FIG. 10, taken along line A-A, further showing a portable electronic device 800 positioned on the touch input surface 734. As shown, the housing 732 may include a first housing part 741 that combines with a second housing part 742 to form an internal volume 750 for components, such as the transmitter coil 760 and a battery 762. Also, the portable electronic device 800 may include a receiver coil 802 capable of receiving energy, by inductive power transmission, from the transmitter coil 760. The received energy at the receiver coil 802 can be used to provide energy that charges a battery 804 located in the portable electronic device 800. It should be noted that an external alternating electromagnetic field 780, or alternating external electromagnetic field, generated by the transmitter coil 760 is capable of passing through i) the touch input surface 734 and ii) the portable electronic device 800 such that the external alternating electromagnetic field 780 reaches the receiver coil 802 (when the portable electronic device 800 is positioned on touch input surface 734, as shown in FIG. 11). Also, the touch input device 730 may include a touch input layer 738, or touch sensitive layer, used to detect a touch input to the touch input surface 734. The touch input layer 738 can be positioned between the first housing part 741 (in a location corresponding to the touch input surface 734) and the transmitter coil 760.

The display assembly 770 may include multiple layers. For example, as shown in the enlarged view, the display assembly 770 may include a touch input layer 772 designed to detect a touch input to the display assembly 770. In this regard, the touch input layer 772 may form a capacitive coupling with a user in a location corresponding to the user's touch input to the display assembly 770. The touch input layer 772 may include a multi-touch layer that enables the display assembly 770 to recognize more than one point of contact. The display assembly 770 may include further a display layer 774 designed to present visual information, as noted above. The display layer 774 may include a display layer that include a liquid crystal display, a light-emitting diode display, an organic light-emitting diode display, or an active-matrix organic light-emitting diode display, as non-limiting examples. Also, in some embodiments, the display assembly 770 may further include a force detection layer 776 designed to measure an amount of force applied to the display assembly 770 by the user. The amount of force may correspond to a particular type of input. In this regard, the display assembly 770 can provide different inputs, based on the amount of force applied to the display assembly 770, to a computing system described herein that is in communication with the touch input device 730. Also, it should be noted that the touch input device 730 may include any feature described for the touch input device 130 described in FIG. 3, and accordingly, the touch input device 730 in FIG. 11 may be in wireless communication with a computing system described herein.

Figure 12:
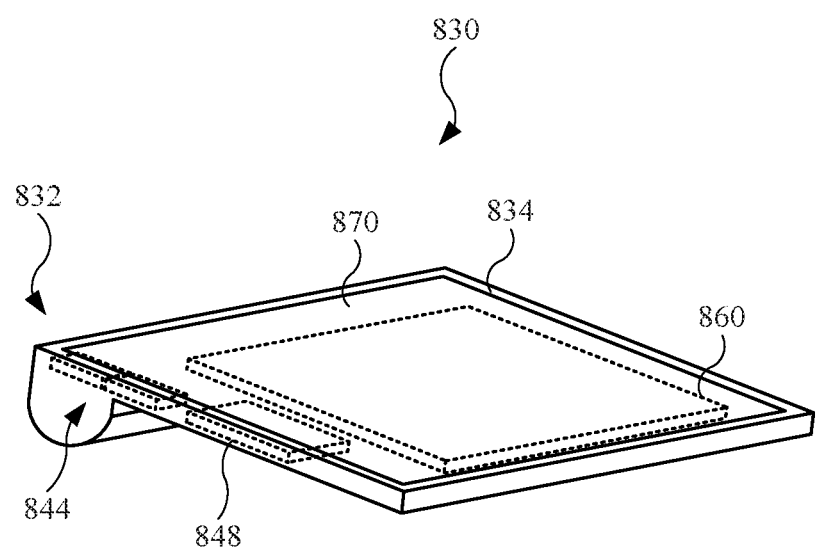
FIG. 12 illustrates an isometric view of an alternate embodiment of a touch input device, showing the touch input device having a display assembly positioned substantially across a surface of the touch input device, in accordance with some described embodiments.

Also, the size of a display assembly (located on a touch input device) is not limited and may extend substantially across an entire surface of the touch input device. For example, FIG. 12 illustrates an isometric view of an alternate embodiment of a touch input device 830, showing the touch input device 830 having a display assembly 870 positioned substantially across a surface 834 of the touch input device 830, in accordance with some described embodiments. The touch input device 830 may include any feature(s) described herein for a touch input device. For example, the touch input device 830 may include a housing 832 that includes an internal volume that carries magnets 844 and a receiver coil 848.

The touch input device 830 may further include a transmitter coil 860 designed to generate an alternating electromagnetic field to inductively charge a device placed on the surface 834. However, as shown, the display assembly 870 substantially covers (including a majority of) the surface 834, which defines a surface previously used as a touch input surface. In this manner, the transmitter coil 860 may generate an alternating electromagnetic field to inductively charge a device placed on the display assembly 870. When the display assembly 870 substantially covers the surface 834, a display layer (similar to the display layer 774 shown in FIG. 11) of the display assembly 870 may be positioned between the surface 834 and the transmitter coil 860.

Although the display assembly 870 substantially covers the surface 834, the display assembly 870 may include a touch input layer (similar to the touch input layer 772 shown in FIG. 11) that allows the display assembly 870 to act as a touch input mechanism for the touch input device 830. For example, the display assembly 870 may receive gestures and touch inputs that are communicated to a keyboard device and/or a computing system (both of which are previously shown and described).

Figure 13:
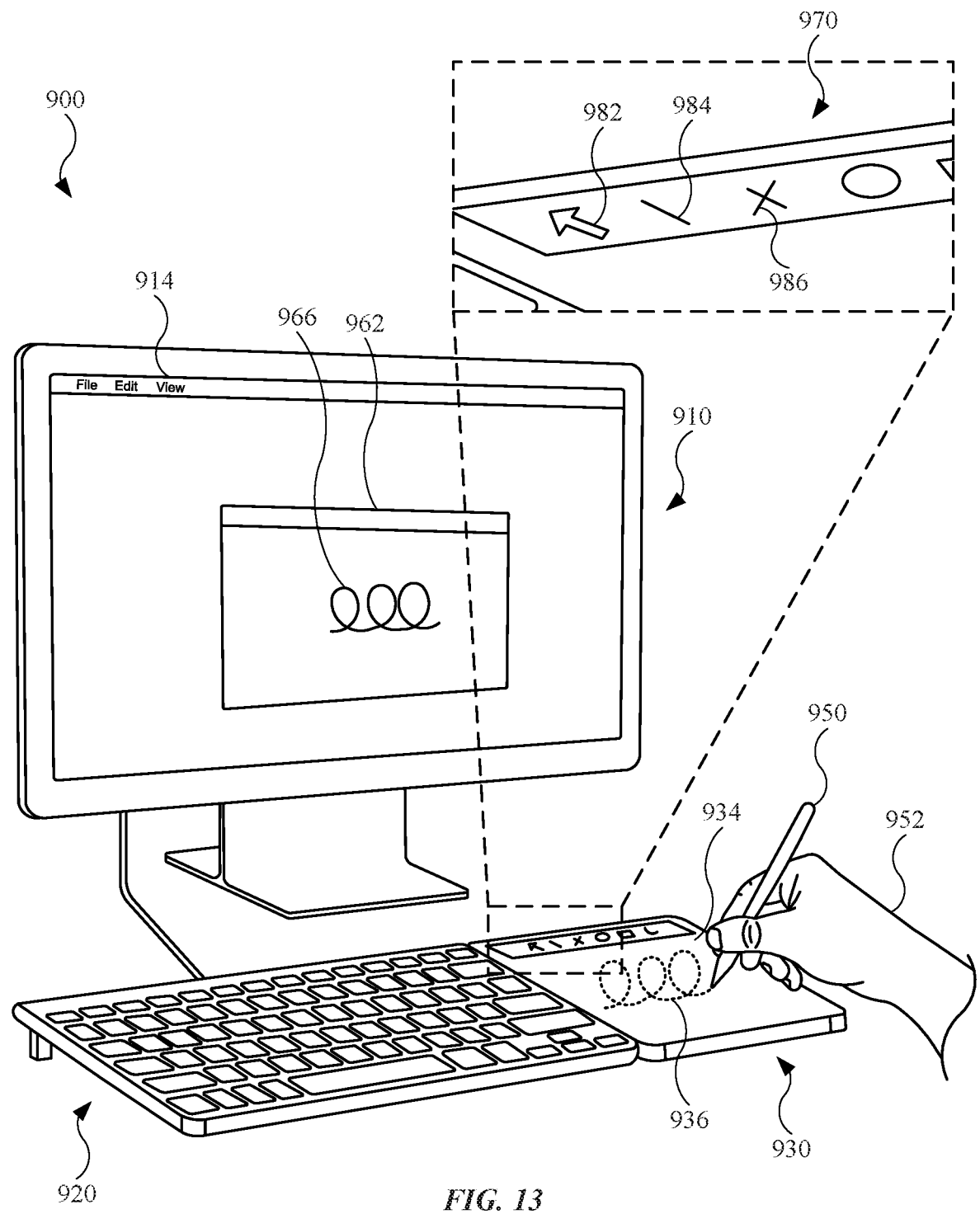
FIG. 13 illustrates an isometric view of an alternate embodiment of a system that includes a computing system, a keyboard device, and a touch input device, showing the touch input device used in conjunction with a handheld device, in accordance with some described embodiments.
Figure 14:
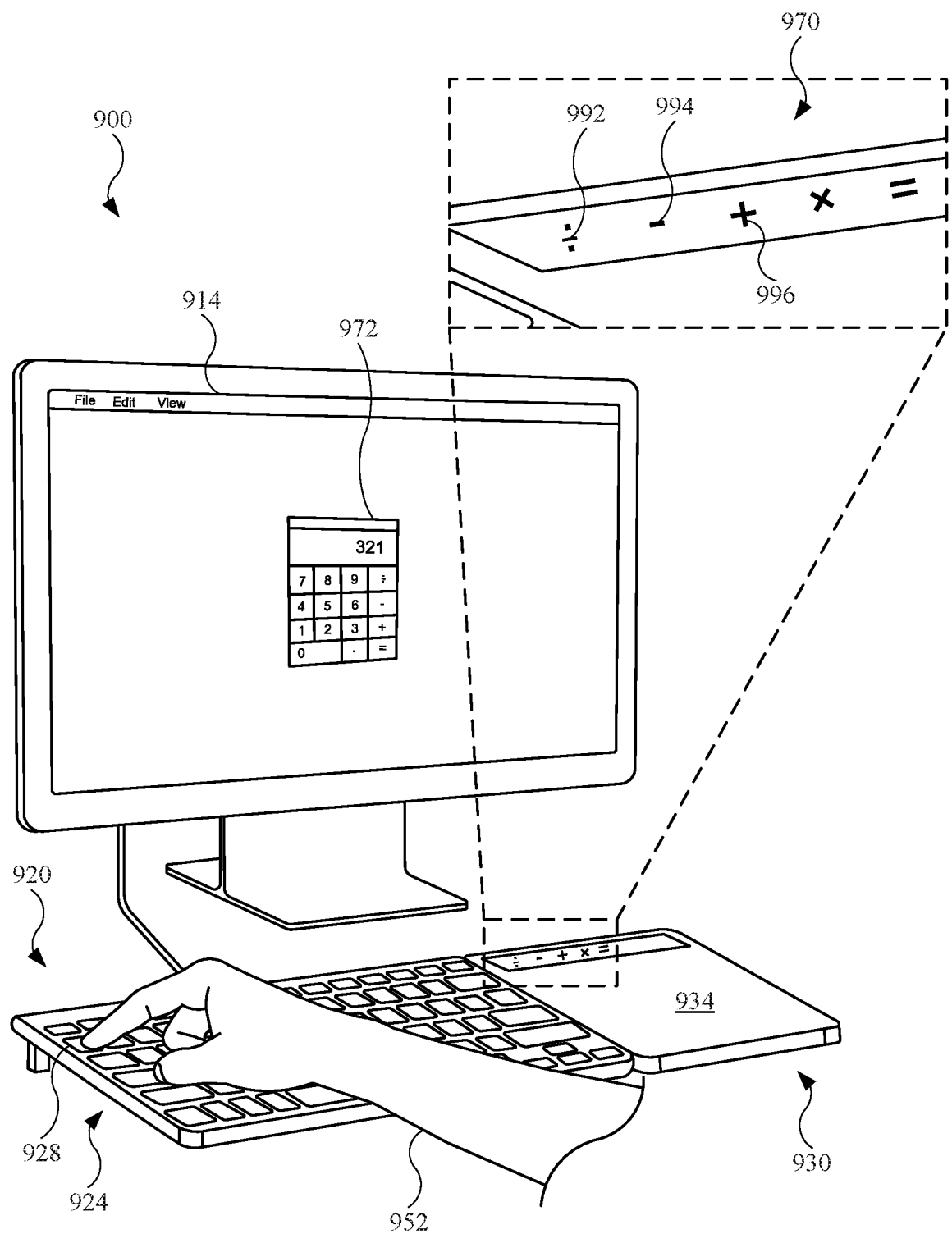
FIG. 14 illustrates an isometric view of the embodiment of the system shown in FIG. 13, showing the display assembly of the touch input device presenting input commands based on the program, or software application, in use by the user on the computing system, in accordance with some described embodiments.

FIGS. 13 and 14 illustrate a system 900 that includes a computing system 910, a keyboard device 920, and a touch input device 930. The computing system 910, the keyboard device 920, and the touch input device 930 may include any feature(s) described herein for a computing system, a keyboard device, and a touch input device, respectively. Also, both the keyboard device 920 and the touch input device 930 may be in communication with the computing system 910. Also, the system 900 shows the keyboard device 920 in wired communication with the computing system 910. Alternatively, the keyboard device 920 can be in wireless communication with the computing system 910.

FIG. 13 illustrates an isometric view of a system 900 that includes a computing system 910, a keyboard device 920, and a touch input device 930, showing the touch input device 930 used in conjunction with a handheld device 950, in accordance with some described embodiments. As shown, a user 952 can guide the handheld device 950 along a touch input surface 934 of the touch input device 930. The motion 936 across the touch input surface 934 is represented by a dotted line. The motion 936 of the handheld device 950 can be detected by the touch input device 930 and communicated to the computing system 910 such that a program 962 (or software application that is run by an operating system of the computing system 910) presents a corresponding motion 966 on a display 914 of the computing system 910. It should be noted that a digit (finger, thumb) of the user 952 can also be used to formulate the motion 936 detected by the touch input device 930.

Also, the touch input device 930 further includes a display assembly 970. The computing system 910 can communicate to the touch input device 930 the program 962 in use by the user 952 and the display assembly 970 can subsequently present visual information in accordance with the program 962. For example, the program 962 may include a drawing or sketching/designing program. When the computing system 910 communicates the type or genre of the program 962 to the touch input device 930, the display assembly 970 can receive a command to present icons specific to the program 962. As shown in the enlarged view, the display assembly 970 can display a virtual application toolbar that includes icons, such as a first icon 982, a second icon 984, and a third icon 986 (with additional icons present), with the first icon 982, the second icon 984, and the third icon 986 associated with the program 962. The first icon 982 includes a graphical illustration of a "pointer tool" that can be selected on the display assembly 970 and subsequently used to "grab" or "drag" a graphical item displayed on the program 962. The second icon 984 includes a graphical illustration of a "line tool" that can be selected on the display assembly 970 and subsequently used to draw a line on the program 962. The third icon 986 includes a graphical illustration of a "delete command" that can be selected on the display assembly 970 and subsequently used to erase a graphical item displayed on the program 962. Accordingly, the user 952 may depress the display assembly 970 in a location corresponding to a desired icon, and the depressed icon can be registered as an input to the display assembly 970. The input (of the selected/depressed icon) can be communicated to the computing system 910, and in particular, to the program 962, causing the program 962 to recognize the selected/depressed icon and activate a function associated with the selected/depressed icon. For example, if the selected/depressed icon is the third icon 986, the program 962 can receive a command to remove a highlighted portion (or portion selected prior to selecting/depressing the third icon 986) of a graphical display item (such as the corresponding motion 966).

FIG. 14 illustrates an isometric view of the embodiment of the system shown in FIG. 13, showing the display assembly 970 of the touch input device 930 presenting input commands based on the program 972, or software application, in use by the user 952 on the computing system 910, in accordance with some described embodiments. As shown, the program 972 presented on the display 914 and in use by the user 952 may include a calculator, and accordingly, the program 972 is different from the program 962 (shown in FIG. 13). The keyboard device 920 may include keys 924 that can be used with the program 972. For instance, when the user 952 depresses a key 928 (such as a number key that provides an input of a number between and including "1" through "0"), the number represented by the key 928 may display on the program 972. This information can be communicated to the touch input device 930. In response, the display assembly 970 may adjust what is presented to display a new virtual application toolbar with new icons usable with the program 972.

As shown in the enlarged view, the display assembly 970 can display a virtual application toolbar that includes icons, such as a first icon 992, a second icon 994, and a third icon 996 (with additional icons present). The first icon 992 includes a graphical illustration of a "division" corresponding to an operation to obtain a quotient (between a dividend and a divisor) that can be displayed on the program 972. The second icon 994 includes a graphical illustration of a "subtraction" corresponding to removing a number from another number, either (or both) of which can be displayed by the program 972. The third icon 996 includes a graphical illustration of an "addition" corresponding to combining a number with another number, either (or both) of which can be displayed by the program 972. The user 952 may depress the display assembly 970 in a location corresponding to a desired icon, and the depressed icon can be registered as an input to the display assembly 970. The input (of the selected/depressed icon) can be communicated to the computing system 910, and in particular, to the program 972, causing the program 972 to recognize the selected/depressed icon and activate a function associated with the selected/depressed icon. For example, if the selected/depressed icon is the third icon 996, the program 972 can receive a command to combine two numbers. In some instances, the computing system 910 may communicate information related to the program 972 to the touch input device 930 without the user 952 having to first depress the key 928, and the display assembly 970 can display relevant icons (specific to the program 972) in a manner shown in FIG. 14.

The system 900 can substitute the touch input device 830 (shown in FIG. 12) for the touch input device 930 (shown in FIGS. 13 and 14). In this manner, when the touch input device 830 is in communication with the computing system 910, the computing system 910 may communicate a software program presented on the display 914 (that is in use by the user 952). The display assembly 870 may receive the communication and adapt to present information in accordance with the software program. For example, as shown in FIG. 14, the program 972 includes a calculator. When the touch input device 830 receives information from the computing system 910 related to the program 972, the display assembly 870 may present visual information representing a calculator, thereby allowing the user 952 to interact with the display assembly 870 and input a command (or commands) by depressing the display assembly 870, with the command (s) detectable by a touch input layer of the display assembly 870. Accordingly, the functions features of a program (such as a calculator) are made available on the display assembly 870, and any inputs or gesture to the display assembly 870 may can be translated to the computing system 910 as a command to the program 972.

Also, the display assembly 870 may be programmable by the user 952. For instance, the user 952 may interact with the computing system 910, causing the computing system 190 to instruct the touch input device 830 to present a selected image (still or dynamic) on the display assembly 870. This allows the touch input device 830 to provide a customizable touch input mechanism by way of the selected image on the display assembly 870.

Figure 15:
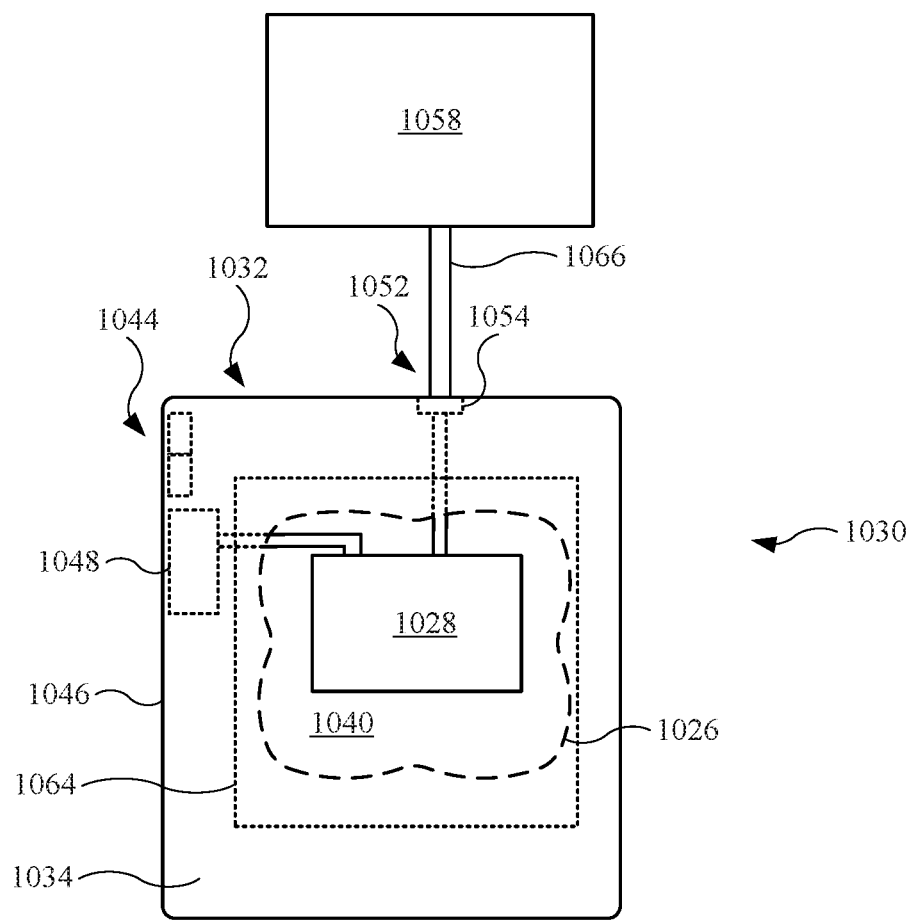
FIG. 15 illustrates a plan view of an alternate embodiment of a keyboard device that includes an internal power supply designed to store energy in order to charge another device, in accordance with some described embodiments.

Touch input devices are shown as receiving energy by inductive power transmission from a keyboard device. However, in some instances, a touch input device described herein does not require a keyboard device for energy and may directly connect to an external power source. For example, FIG. 15 illustrates a plan view of an alternate embodiment of a touch input device 1030 that includes an internal power supply 1028 designed to store energy in order to charge another device, in accordance with some described embodiments. The touch input device 1030 may include any feature(s) described herein for a keyboard device. As shown, the touch input device 1030 may include a housing 1032 and a touch input surface 1034. Also, the touch input device 1030 may include magnets 1044 arranged along a sidewall 1046 of the housing 1032 in a manner similar to a manner previously described for magnets in a touch input device. Accordingly, a device, such as a keyboard device described herein, can magnetically couple to the touch input device 1030 along the sidewall 1046. Also, the touch input device 1030 may further include a receiver coil 1048 suitable for use with a receiver coil previously described.

A partial internal view 1026 of the touch input device 1030 shows the internal power supply 1028 within an internal volume 1040 (defined by the housing 1032) that provides a space for components (circuit boards, processor circuits, wireless circuits, light elements, etc.). The internal power supply 1028 may include a rechargeable DC battery. The touch input device 1030 may include a port 1052 that includes a connector 1054 designed to electrically couple with an external power supply 1058 by a cable 1066. The external power supply 1058 may receive AC from a wall outlet and then convert AC to DC. The cable 1066 may also include circuitry (not shown) designed to convert AC to DC. The external power supply 1058 may also store energy, similar to a battery or battery pack. The external power supply 1058, when coupled to the connector 1054, can provide energy to the internal power supply 1028, which can be stored in the internal power supply 1028 for later use. In this regard, the internal power supply 1028 may supply energy to a transmitter coil 1064 positioned in the internal volume 1040. The energy provided by the internal power supply 1028 may pass through a power inverter (not shown) in order to switch from DC to AC, thereby allowing an electronic device (such as those shown in FIGS. 6-8, as non-limiting examples) to receive energy through inductive power transfer when placed on the touch input surface 1034.

In order to communicate with a computing system, keyboard device, or electronic device described herein, the touch input device 1030 may include wireless communication circuitry, such as the wireless communication circuitry 258 (shown in FIG. 3). As a result, the touch input device 1030 may be referred to as a wireless touch input device that can operate and charge devices independently of a keyboard device. Also, any electronic device shown in FIGS. 6-8 may include wireless communication circuitry used to establish communication with the touch input device 1030.

Figure 16:
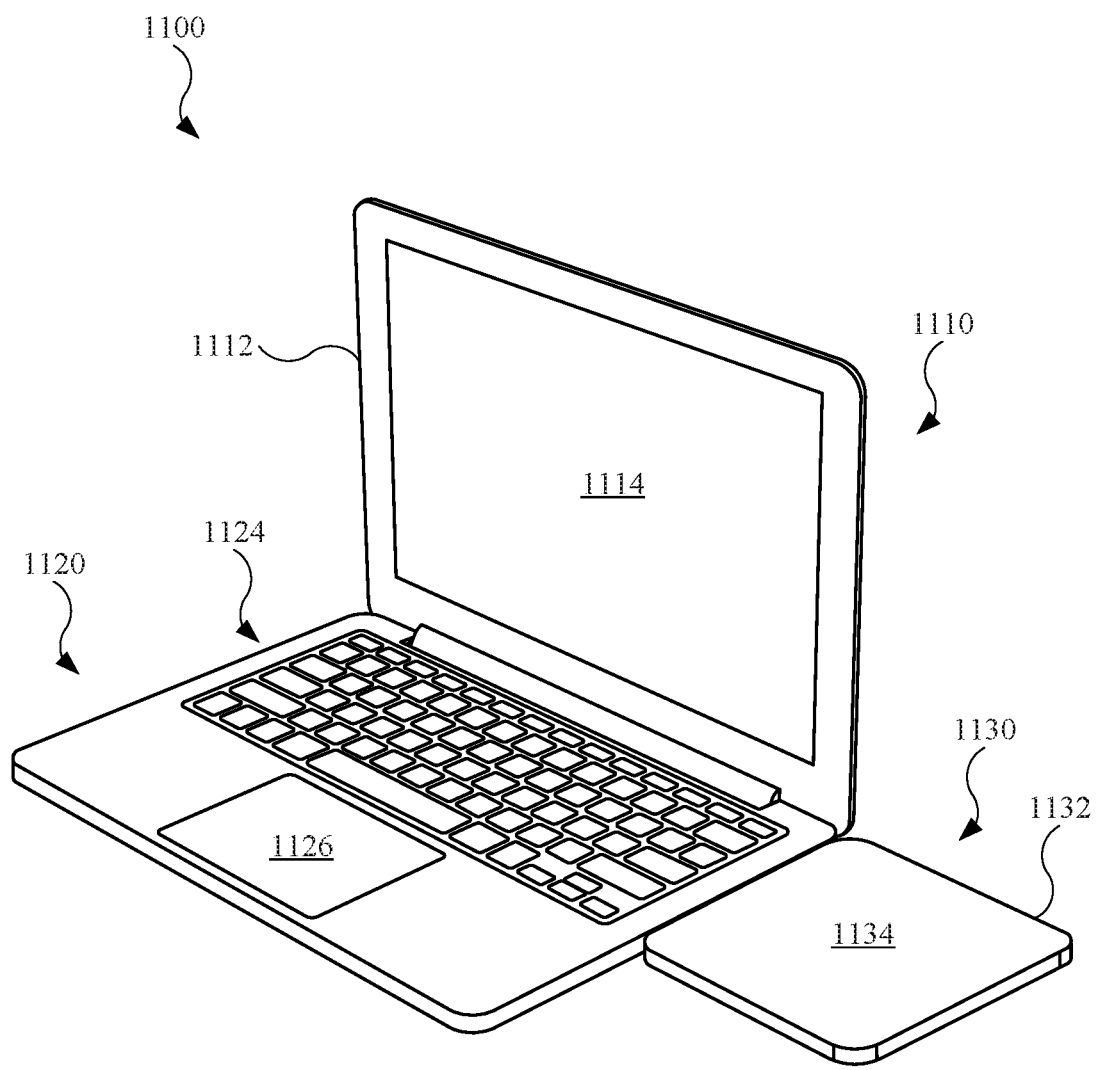
FIG. 16 illustrates an isometric view of an alternate embodiment of a system, showing the computing system taking the form of a laptop computer device, in accordance with some described embodiments.

FIG. 16 illustrates an isometric view of an alternate embodiment of a system 1100, showing the computing system 1110 taking the form of a laptop computer device, in accordance with some described embodiments. As shown, the computing system 1110 may include a display housing 1112 coupled to a base portion 1120 in a manner that allows the display housing 1112 to rotate with respect to the base portion 1120, or vice versa. The display housing 1112 may include a display assembly 1114. The base portion 1120 may include keys 1124 designed to provide an input to a processor circuit (not shown) in the computing system 1110. The computing system 1110 may further include a touch pad 1126 designed to receive a touch input that translates motion (to the touch pad 1126), which may provide a command or input to the computing system 1110. The system 1100 may further include a touch input device 1130 that is separate from the base portion 1120. The touch input device 1130 may include a housing 1132 that defines a touch input surface 1134. The touch input device 1130 is designed to translate motion of a movement of a user, or an object carried by the user, across the touch input surface 1134. The base portion 1120 and the touch input device 1130 may include any feature(s) previously described for a keyboard device and a touch input device, respectively.

Figure 17:
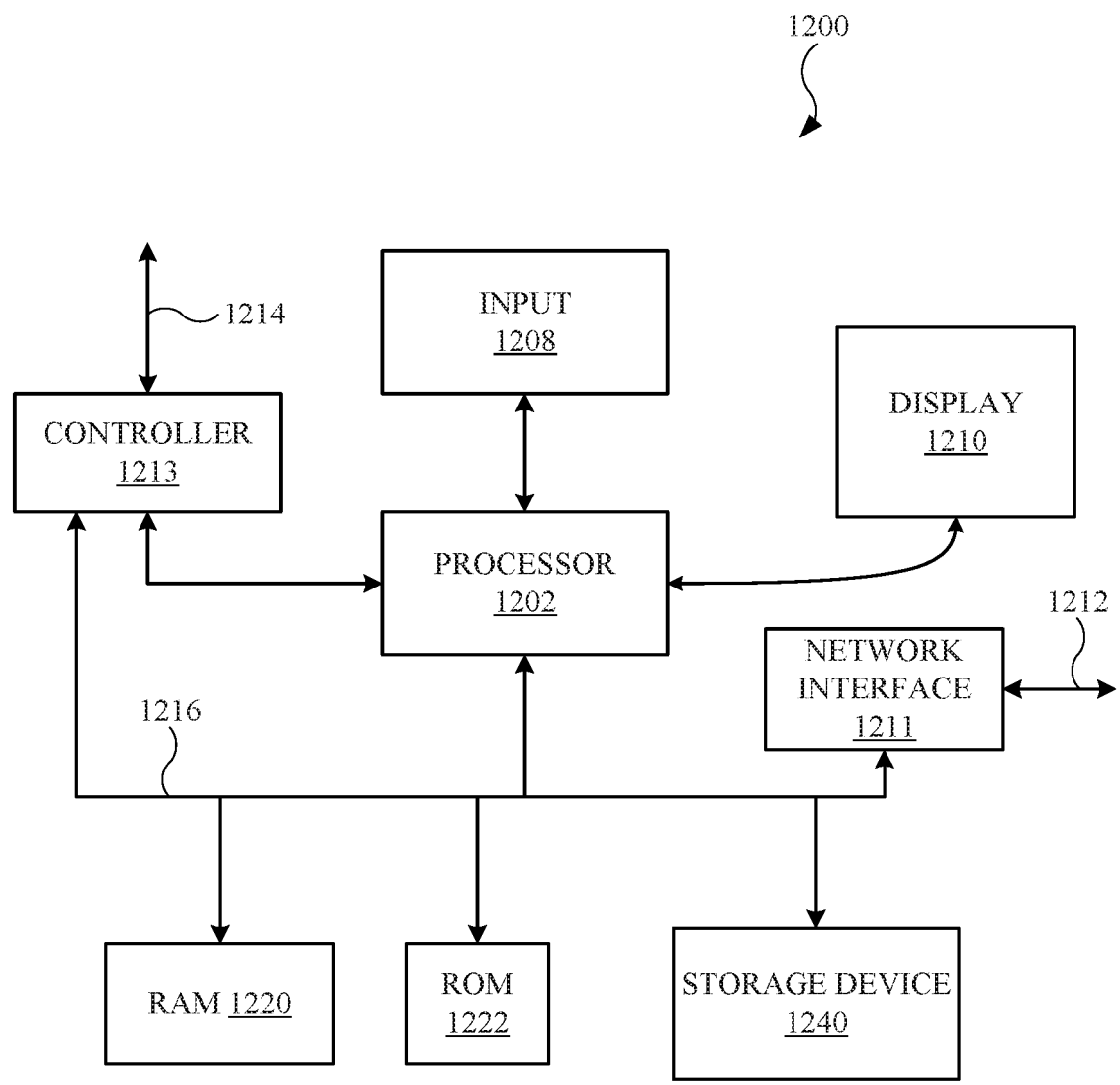
FIG. 17 illustrates a detailed view of a computing system that can represent computing systems described herein used to implement the various techniques described herein, in accordance with some described embodiments.

FIG. 17 illustrates a detailed view of a computing system 1200 that can represent computing systems described herein used to implement the various techniques described herein, in accordance with some described embodiments. For example, the detailed view illustrates various components that can be included in computing system 1200 described in conjunction with FIG. 1, the portable electronic device 300 shown in FIG. 4, the devices shown in FIGS. 6-8, the portable electronic device 800 shown in FIG. 11, the computing system 910 shown in FIGS. 13 and 14, and the computing system 1110 shown in FIG. 16. As shown in FIG. 17, the computing system 1200 can include a processor 1202 that represents a microprocessor or controller for controlling the overall operation of the computing system 1200. The computing system 1200 can also include a user input device 1208 that allows a user of the computing system 1200 to interact with the computing system 1200. For example, the user input device 1208 can take a variety of forms, such as a button, keypad, dial, touch screen, audio input interface, visual/image capture input interface, input in the form of sensor data, and so on. Still further, the computing system 1200 can include a display 1210 that can be controlled by the processor 1202 (e.g., via a graphics component) to display information to the user. A data bus 1216 can facilitate data transfer between at least a storage device 1240, the processor 1202, and a controller 1213. The controller 1213 can be used to interface with and control different equipment through an equipment control bus 1214. The computing system 1200 can also include a network/bus interface 1211 that couples to a data link 1212. In the case of a wireless connection, the network/bus interface 1211 can include a wireless transceiver.

As noted above, the computing system 1200 also includes the storage device 1240, which can include a single disk or a collection of disks (e.g., hard drives). In some embodiments, the storage device 1240 can include flash memory, semiconductor (solid state) memory or the like. The computing system 1200 can also include a Random-Access Memory 1220, or RAM, and a Read-Only Memory 1222, or ROM. The Read-Only Memory 1222 can store programs, utilities or processes to be executed in a non-volatile manner. The Random-Access Memory 1220 can provide volatile data storage, and stores instructions related to the operation of applications executing on the computing system 1200

Figure 18:
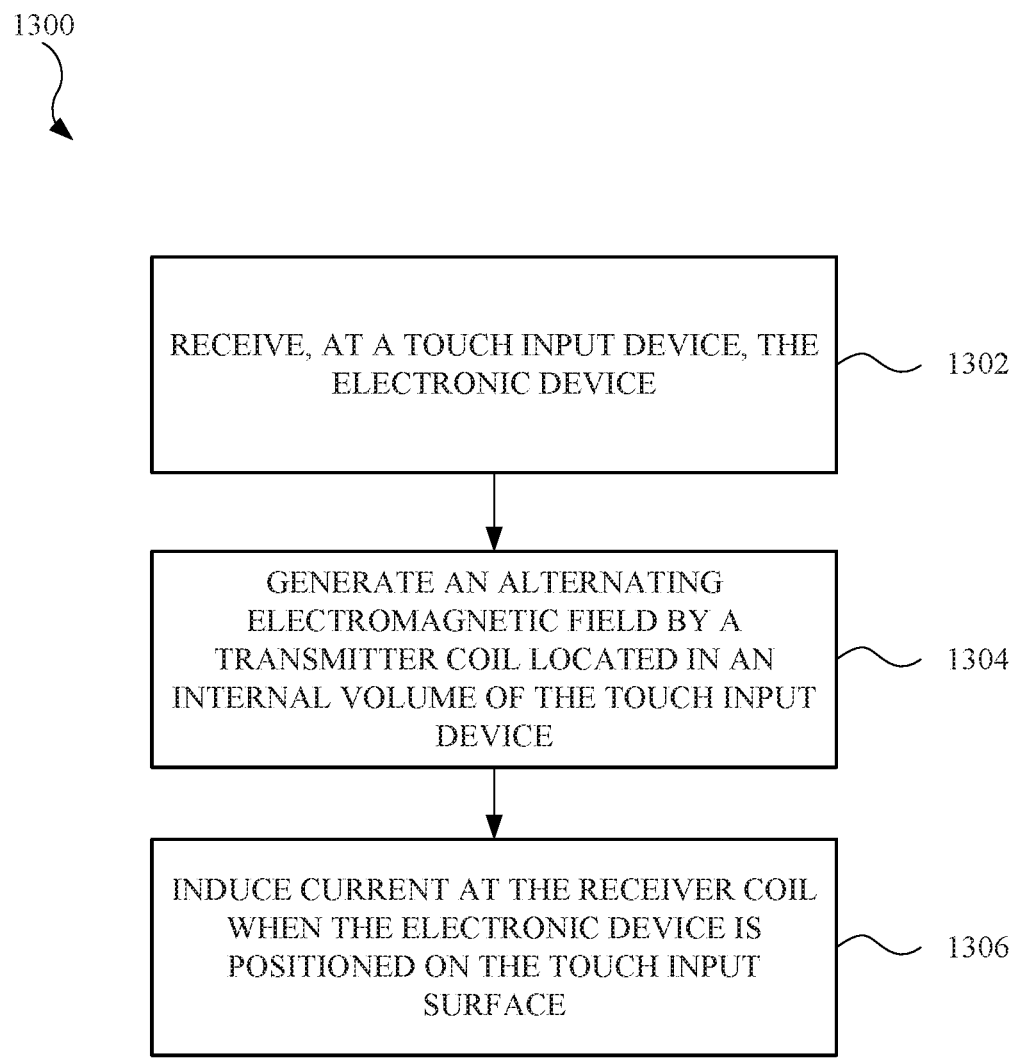
FIG. 18 illustrates a flowchart showing a method for charging an electronic device that includes a battery and a receiver coil, in accordance with some described embodiments.

FIG. 18 illustrates a flowchart 1300 showing a method for charging an electronic device that includes a battery and a receiver coil, in accordance with some described embodiments. The electronic device may include any one of mobile wireless communication device (smartphone, tablet device), a wearable electronic device (electronic watch), a handheld device (digital stylus), and a pointing device (mouse), as non-limiting examples. The receiver coil in the electronic device is designed to receive energy, by inductive power transmission, from a transmitter coil. The energy can be used to charge/recharge the battery in the electronic device.

In step 1302, the electronic device is received at a touch input device. The touch input device includes a touch input surface through which motion across the touch input surface is translated and provided to a computing system. The touch input surface is also configured to receive a single "motionless" input, similar to a mouse click. In this regard, the touch input device can be used as a touch pad, or the like, by using the touch input surface.

In step 1304, a transmitter coil, located in an internal volume of the touch input device, generates an alternating electromagnetic field. By receiving AC, the transmitter coil can generate the alternating electromagnetic field. Also, the transmitter coil (and the receiver coil) can be made from an electrically conductive material, such as copper.

In step 1306, current is induced at the receiver coil (of the electronic device) when the electronic device is positioned on the touch input surface. The receiver coil may use a rectifier to transfer AC to DC so that at least some of the induced current is stored as energy in the battery. Also, in order for the touch input device to receive energy, the touch input device may include its own receiver coil to receive, by inductive power transmission, AC from a transmitter coil from an external device, such as a keyboard device. Also, the touch input device may include a port designed to receive energy from an external source, such as a wall outlet.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A touch input device suitable for use with a computing system, the touch input device comprising:
    a portable housing separate from the computing system, the portable housing defining an internal volume;
    a touch sensitive layer disposed in the internal volume and covered by a touch input surface, the touch sensitive layer configured to detect a user input to the touch input surface;
    a processor that translates the user input to the touch input surface and provides information corresponding to the user input to the computing system; and
    an inductive charging module disposed in the internal volume and covered by the touch input surface, the inductive charging module configured to inductively charge a battery in an electronic device when the electronic device is in contact with the touch input surface.

2. The touch input device of claim 1, wherein the touch input surface lacks a display.

3. The touch input device of claim 2, further comprising a receiver coil disposed in the internal volume and configured to receive an induced current by inductive power transmission that results in the induced current providing energy to the battery.

4. The touch input device of claim 3, further comprising a magnet disposed in the internal volume and separate from the inductive charging module, the magnet configured to magnetically couple to a magnet of a keyboard device that includes a transmitter coil that is configured to provide an alternating electromagnetic field that is received by the receiver coil to generate the induced current.

5. The touch input device of claim 1, further comprising wireless communication circuitry capable of radio frequency communication that places the processor in communication with the computing system and a keyboard device, wherein when the processor is in communication with the keyboard device, the processor is capable of providing an electrical signal corresponding to the user input to the computing system via the keyboard device such that the processor lacks direct communication with the computing system.

6. The touch input device of claim 1, further comprising a display assembly disposed laterally with respect to the touch input layer, the display assembly comprising a display touch input layer and a display layer, wherein the display assembly comprises a virtual application toolbar displayed on the display layer and selectable via the display touch input layer, wherein the virtual application toolbar is specific to an application executable by the computing system and displayed on the display layer.

7. The touch input device of claim 1, wherein:
the touch input surface overlays the touch sensitive layer, and
the touch sensitive layer overlays the inductive charging module.

8. A keyboard device suitable for use with a computing system, the keyboard device comprising:
a keyboard device housing that defines an internal volume;
keys carried by the keyboard device housing;
a magnet disposed in the internal volume and configured to magnetically couple to a touch input device magnet; and
an inductive transmitter coil disposed in the internal volume and separate from the magnet, wherein:
the inductive transmitter coil is at least partially covered by the keys,
the inductive transmitter coil is configured to transmit energy by inductive power transmission to a receiver coil of the touch input device, and
the energy transmitted by the inductive transmitter coil is configured to charge a battery in the touch input device or power a component of the touch input device.

9. The keyboard device of claim 8, further comprising a power source located in the internal volume and configured to supply the energy to the inductive transmitter coil.

10. The keyboard device of claim 9, wherein the power source comprises a battery that stores the energy that is transferred to the touch input device via the inductive transmitter coil.

11. The keyboard device of claim 10, further comprising a port configured to receive energy to charge the battery.

12. The keyboard device of claim 8, further comprising wireless communication circuitry disposed in the internal volume, the wireless communication circuitry configured to communicate with the touch input device and receive a command defined by a touch input to the touch input device.

13. The keyboard device of claim 12, further comprising a circuit board disposed in the internal volume, wherein the circuit board is in communication with the computing system based on the wireless communication circuitry.

14. The keyboard device of claim 8, wherein the inductive power transmission is defined in part by an alternating electromagnetic field generated by the inductive transmitter coil.

15. A method for charging an electronic device that includes a battery and a receiver coil, the method comprising:
by a touch input device:
receiving, on and in contact with a touch input surface of the touch input device, the electronic device, the touch input device comprising a portable housing, the touch input surface configured to detect a user input and translate the user input to a computing system;
generating an alternating electromagnetic field by a transmitter coil located in an internal volume of the portable housing; and
inducing current, by the transmitter coil, when the electronic device is positioned on the touch input surface, the induced current configured to charge the battery.

16. The method of claim 15, further comprising:
receiving, at the touch input device, a second alternating electromagnetic field by a second transmitter coil located in an external device; and
inducing current at a second receiver coil located in the internal volume, wherein the induced current is used to provide by the transmitter coil in the touch input device to generate the alternating electromagnetic field.

17. The method of claim 16, wherein receiving, at the touch input device, comprises receiving the electronic device on a surface that lacks a display the external device comprises a keyboard device.

18. The method of claim 15, further comprising receiving, at the touch input device, electrical energy from an external power source.

19. The method of claim 15, wherein generating the alternating electromagnetic field is subsequent to receiving the electronic device.

20. The method of claim 15, further comprising:
providing a magnet in the internal volume, the magnet separate from the transmitter coil and the receiver coil;
magnetically coupling the touch input device to a magnet in a keyboard device to define a magnetic circuit; and
initiating the generating of the alternating electromagnetic field subsequent to determining the magnetic circuit is formed.

* * * * *